United States Patent
Fukuta et al.

(10) Patent No.: US 10,306,637 B2
(45) Date of Patent: May 28, 2019

(54) RADIO BASE STATION AND USER TERMINAL

(71) Applicant: KYOCERA CORPORATION, Kyoto (JP)

(72) Inventors: Noriyoshi Fukuta, Inagi (JP); Naohisa Matsumoto, Kawasaki (JP); Hiroyuki Urabayashi, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 73 days.

(21) Appl. No.: 15/582,986

(22) Filed: May 1, 2017

(65) Prior Publication Data

US 2017/0238320 A1    Aug. 17, 2017

Related U.S. Application Data

(63) Continuation of application No. PCT/JP2015/081213, filed on Nov. 5, 2015.
(Continued)

(51) Int. Cl.
*H04W 4/00* (2018.01)
*H04W 72/04* (2009.01)
(Continued)

(52) U.S. Cl.
CPC ......... *H04W 72/0453* (2013.01); *H04L 5/001* (2013.01); *H04L 5/006* (2013.01);
(Continued)

(58) Field of Classification Search
None
See application file for complete search history.

(56) References Cited

U.S. PATENT DOCUMENTS

| 2010/0322185 A1* | 12/2010 | Park | H04W 72/085 |
| | | | 370/331 |
| 2012/0157143 A1* | 6/2012 | Tsunekawa | H04W 72/06 |
| | | | 455/509 |

(Continued)

FOREIGN PATENT DOCUMENTS

| JP | 2014-171007 A | 9/2014 |
| JP | 2014-187499 A | 10/2014 |

OTHER PUBLICATIONS

Nokia Siemens Networks, Nokia; Primary Component Carrier Selection, Monitoring, and Recovery; 3GPP TSG RAN WG1 #57 Meeting; R1-091779; May 4-8, 2009; 7 pages; San Francisco, USA.

(Continued)

*Primary Examiner* — Bob A Phunkulh
(74) *Attorney, Agent, or Firm* — Studebaker & Brackett PC

(57) ABSTRACT

A radio base station according to an embodiment is a radio base station configured to use a specific frequency band which includes a plurality of component carriers having a predetermined bandwidth and which is allowed to be utilized by a plurality of network operators or a plurality of communication systems. The radio base station comprises: a controller configured to select, from among the plurality of component carriers, a target component carrier in which a reference signal used in the specific frequency band should be transmitted; and a transmitter configured to use the target component carrier to transmit the reference signal. The controller selects, as the target component carrier, a first component carrier that satisfies a first condition. The first condition is that an interference power amount falls below a predetermined threshold value.

10 Claims, 33 Drawing Sheets

Related U.S. Application Data

(60) Provisional application No. 62/076,824, filed on Nov. 7, 2014, provisional application No. 62/162,183, filed on May 15, 2015, provisional application No. 62/203,563, filed on Aug. 11, 2015.

(51) Int. Cl.
*H04W 16/14* (2009.01)
*H04L 5/00* (2006.01)
*H04W 72/08* (2009.01)

(52) U.S. Cl.
CPC .......... *H04L 5/0048* (2013.01); *H04W 16/14* (2013.01); *H04W 72/04* (2013.01); *H04W 72/082* (2013.01)

(56) References Cited

U.S. PATENT DOCUMENTS

| | | | |
|---|---|---|---|
| 2012/0176939 | A1 | 7/2012 | Qu et al. |
| 2012/0327878 | A1* | 12/2012 | Pedersen .................. H04L 5/006 370/329 |
| 2013/0142113 | A1* | 6/2013 | Fong ........................ H04W 4/70 370/328 |
| 2013/0252622 | A1 | 9/2013 | Kobayashi |
| 2013/0336156 | A1* | 12/2013 | Wei .......................... H04L 5/001 370/252 |
| 2015/0139092 | A1* | 5/2015 | Guo ......................... H04L 5/001 370/329 |

OTHER PUBLICATIONS

LG Electronics Inc., "Channel selection based on RSSI measurement", 3GPP TSG-RAN WG2 #91bis, R2-154472, Oct. 5-9, 2015, Malmo, Sweden.

International Search Report issued in PCT/JP2015/081213; dated Jan. 19, 2016.

Written Opinion issued in PCT/JP2015/081213; dated Jan. 19, 2016.

3rd Generation Partnership Project; Technical Specification Group Radio Access Network; Evolved Universal Terrestrial Radio Access (E-UTRA) and Evolved Universal Terrestrial Radio Access Network (E-UTRAN); 3GPP TS 36.300 V12.2.0; Mar. 2014; pp. 1-209; Release 12; 3GPP Organizational Partners.

Hitachi Ltd.; "Design Targets for LAA using LTE"; 3GPP TSG RAN WG1 Meeting #78bis; R1-144221; Oct. 6-10, 2014; pp. 1-4; Ljubljana, Slovenia.

Kyocera; "Further considerations on the essential functionalities for LAA"; 3GPP TSG RAN WG1 Meeting #79; R1-144955; Nov. 17-21, 2014; pp. 1-10; San Francisco.

Ericsson, Qualcomm, Huawei, Alcatel-Lucent; "Study on Licensed-Assisted Access using LTE"; 3GPP TSG RAN Meeting #65; RP-141664; Sep. 9-12, 2014; pp. 1-8; Edinburgh, Scotland.

MCC Support; "Final Report of 3GPP TSG RAN WG1 #78bis v1.0.0"; 3GPP TSG RAN WG1 Meeting #79; R1-144546; Nov. 17-21, 2014; pp. 1-90; San Francisco.

An Office Action issued by the Japanese Patent Office dated Jun. 13, 2017, which corresponds to Japanese Patent Application No. 2016-557808 and is related to U.S. Appl. No. 15/582,986; with Concise Statement of Relevance; 4pp.

Huawei, HiSilicon; "Potential solutions for LAA-LTS design"; 3GPP TSG RAN WG1 Meeting #78bis; R1-143726; Oct. 10-14, 2014; Ljubljana, Solvenia; 6pp.

Kyocera; "Design overview on LAA"; 3GPP TSG RAN WG1 Meeting #78bis; R1-144157; Oct. 6-10, 2014; Ljubljana, Slovenia; 7pp.

Qualcomm Incorporated; "Considerations on RRM measurements for LAA-LTE"; 3GPP TSG-RAN WG2 Meeting #90bis; R2-152708; May 25-29, 2015; total 7 pages; Fukuoka, Japan.

Kyocera; "Reference signal design for LAA"; 3GPP TSG RAN WG1 Meeting #80; R1-150626; Feb. 9-13, 2015; total 5 pages; Athens, Greece.

* cited by examiner

FIG. 7
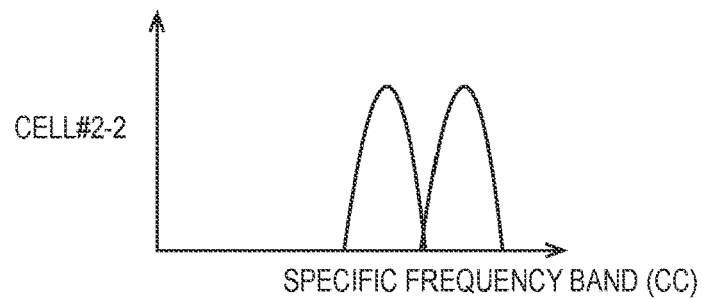
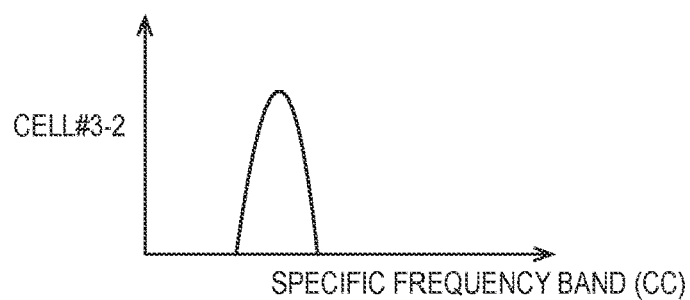
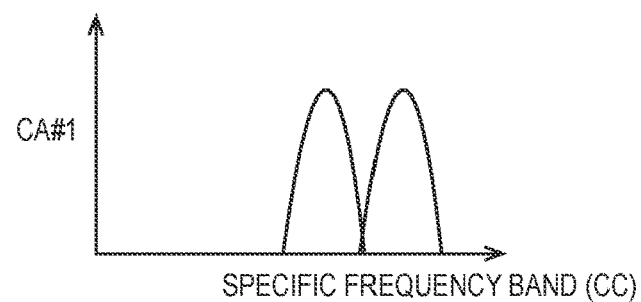
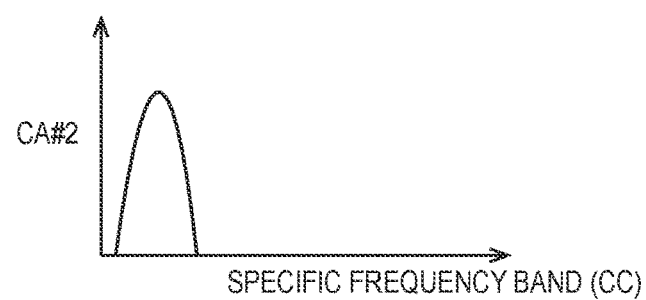

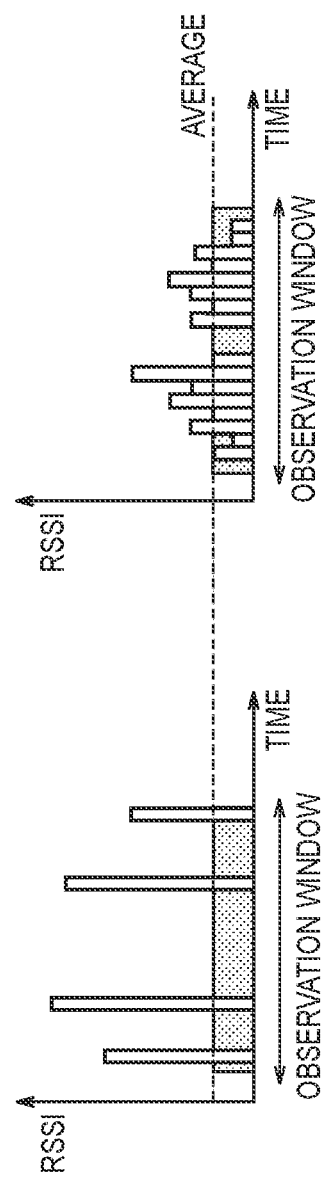

RADIO BASE STATION AND USER TERMINAL

RELATED APPLICATIONS

This application is a continuation application of international application PCT/JP2015/081213, filed Nov. 5, 2015, which claims benefit of U.S. Provisional Application No. 62/076,824, filed Nov. 7, 2014, U.S. Provisional Application No. 62/162,183, filed May 15, 2015, U.S. Provisional Application No. 62/203,563, filed Aug. 11, 2015, the entirety of all applications hereby expressly incorporated by reference.

TECHNICAL FIELD

The present disclosure relates to a radio base station and a user terminal configured to use a specific frequency band which is allowed to be utilized by a plurality of network operators or a plurality of communication systems.

BACKGROUND ART

In 3GPP (3rd Generation Partnership Project), which is a project aiming to standardize a mobile communication system, utilization of a new frequency band is considered in order to respond to a rapid increase in traffic demand (for example, see Non Patent Document 1).

Here, as a new frequency band, a specific frequency band which includes a plurality of component carriers having a predetermined bandwidth and which is allowed to be used by a plurality of network operators or a plurality of communication systems, may be considered.

As a specific frequency band, a bandwidth used for, for example, Wi-Fi (registered trademark), Bluetooth (registered trademark), and the like, that is, an unlicensed band not requiring a license, may be considered. In 3GPP, a technology is considered where an unlicensed band is used for an LTE system (LAA: Licensed Assisted Access).

In LAA, between a licensed cell (L-Cell: Licensed LTE Cell) in which a licensed band requiring a license is used and an unlicensed cell (U-Cell: Unlicensed LTE Cell) in which an unlicensed band is used, a carrier aggregation is applied.

PRIOR ART DOCUMENT

Non-Patent Document

Non Patent Document 1: 3GPP Technical Report "TS 36.300 V12.1.0" March, 2014

SUMMARY

A radio base station according to an embodiment is a radio base station configured to use a specific frequency band which includes a plurality of component carriers having a predetermined bandwidth and which is allowed to be utilized by a plurality of network operators or a plurality of communication systems. The radio base station comprises: a controller configured to select, from among the plurality of component carriers, a target component carrier in which a reference signal used in the specific frequency band should be transmitted; and a transmitter configured to use the target component carrier to transmit the reference signal. The controller selects, as the target component carrier, a first component carrier that satisfies a first condition. The first condition is that an interference power amount falls below a predetermined threshold value.

A radio base station according to an embodiment is a radio base station configured to use a specific frequency band which includes a plurality of component carriers having a predetermined bandwidth and which is allowed to be utilized by a plurality of network operators or a plurality of communication systems. The base station comprises: a controller configured to select, from among the plurality of component carriers, a target component carrier on which a radio terminal should be instructed to perform sensing; and a transmitter configured to transmit, to the radio terminal, a signal to instruct sensing on the target component carrier. The controller selects, as the target component carrier, a first component carrier that satisfies a first condition. The first condition is that an interference power amount falls below a predetermined threshold value.

A radio base station according to an embodiment is a radio base station configured to use an unlicensed frequency band which includes a plurality of component carriers. The radio base station comprises: a controller configured to select, from among the plurality of component carriers, a target component carrier in which a reference signal used in the unlicensed frequency band should be transmitted; and a transmitter configured to use the target component carrier to transmit the reference signal. The controller is configured to select, as the target component carrier, a first component carrier that satisfies a first condition. The first condition is that an interference power amount falls below a predetermined threshold value.

BRIEF DESCRIPTION OF THE DRAWINGS

FIG. 7 is a diagram showing a specific frequency band according to the embodiment.

FIG. 36 is a diagram for describing an example of overserved RSSI measurements in an UE.

DESCRIPTION OF THE EMBODIMENT

Figure 1:
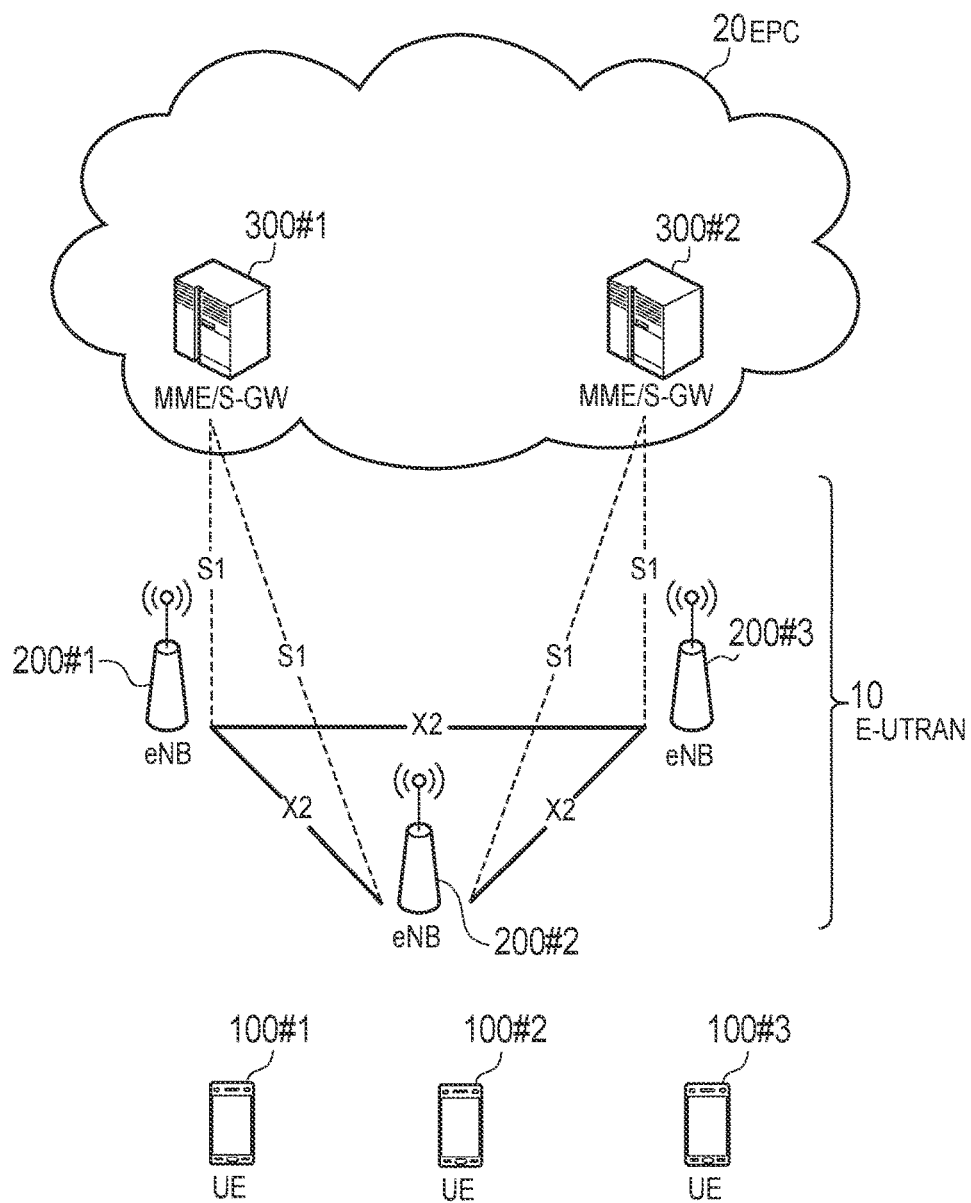
FIG. 1 is a configuration diagram of an LTE system according to an embodiment.

An embodiment will be described with reference to the drawings, below. It is noted that, in the following description of the drawings, identical or like numerals and symbols are assigned to identical or like parts.

However, it should be noted that the drawings are schematically shown and the ratio and the like of each dimension are different from the real ones. Accordingly, specific dimensions and the like should be determined in consideration of the explanation below. Further, it is needless to say that relations and ratios among the respective dimensions may differ among the diagrams.

[Summary of Disclosure]

A user terminal according to a summary of disclosure is a user terminal configured to use a specific frequency band which is allowed to be utilized by a plurality of network operators or a plurality of communication systems. The user terminal comprises: a controller configured to measure a frequency subject to measurement included in the specific frequency band, wherein the controller: measures a received signal strength indicator of the frequency subject to measurement, if a radio base station does not utilize the frequency subject to measurement as a frequency subject to carrier aggregation; and measures reception quality of a reference signal used in the frequency subject to measurement, if the radio base station utilizes the frequency subject to measurement as the frequency subject to carrier aggregation.

In the summary of disclosure, the user terminal measures the received signal strength indicator of the frequency subject to measurement, if the radio base station does not utilize the frequency subject to measurement as a frequency subject to carrier aggregation. Thus, if the radio base station does not utilize the frequency subject to measurement as the frequency subject to carrier aggregation and the reference signal is not transmitted in the frequency subject to measurement, then it is possible to resolve a problem that there is no object (reference signal) of which the reception quality (RSRP and/or RSRQ) should be measured, and the base station is capable of utilizing the measurement result of the received signal strength indicator.

A radio base station according to an embodiment is a radio base station configured to use a specific frequency band which includes a plurality of component carriers having a predetermined bandwidth and which is allowed to be utilized by a plurality of network operators or a plurality of communication systems. The radio base station comprises: a controller configured to select, from among the plurality of component carriers, a target component carrier in which a reference signal used in the specific frequency band should be transmitted; and a transmitter configured to use the target component carrier to transmit the reference signal. The controller selects, as the target component carrier, a first component carrier that satisfies a first condition. The first condition is that an interference power amount falls below a predetermined threshold value.

In the embodiment, the controller performs a storing process of storing: carrier identification information for identifying a second component carrier that does not satisfy the first condition but satisfies a second condition; and at least one of an interference power amount in the second component carrier and a signal count of the reference signals used in the second component carrier. The second condition is that the first condition is not satisfied due to interference received from a same type communication system as a communication system to which the radio base station belongs.

In the embodiment, if there is no first component carrier, then the controller selects, on the basis of at least one of the stored interference power amount and signal count, as the target component carrier, the one second component carrier from among the plurality of second component carriers.

In the embodiment, if there are no first component carrier and second component carrier, then the controller limits utilization or addition of a component carrier included in the specific frequency band.

In the embodiment, the controller determines, on the basis of whether or not a component carrier included in the specific frequency band is already utilized, whether or not to perform the storing process.

The radio base station according to the embodiment further comprises: a receiver configured to receive a feedback sent back from a radio terminal in response to the reference signal. The controller determines, on the basis of the feedback, whether or not to utilize the target component carrier for the radio terminal.

In the embodiment, the transmitter continues transmission of a predetermined signal during a period between an end of a sensing on the plurality of component carriers and a start of transmission of the reference signal.

In the embodiment, the transmitter uses only some of target resource blocks from among a resource block configuring the target component carrier to thereby transmit the reference signal.

In the embodiment, the transmitter transmits a pattern indicating a location of the target resource block.

In the embodiment, the transmitter transmits the pattern in a same subframe as a subframe in which the reference signal should be transmitted.

In the embodiment, the transmitter transmits desiring information in an $n^{th}$ reference signal transmission opportunity, wherein the desiring information is for identifying a ratio at which the specific frequency band is desirably occupied or a data amount desirably transmitted in the specific frequency band in a period between the $n^{th}$ reference signal transmission opportunity and an $n+k^{th}$ (where k is an integer being equal to or more than 1) reference signal transmission opportunity.

In the embodiment, the transmitter transmits actual performance information in an $n^{th}$ reference signal transmission opportunity, wherein the actual performance information is for identifying a ratio or a time at which the specific frequency band is occupied or a data amount transmitted in the specific frequency band in a period between a predetermined timing before the $n^{th}$ reference signal transmission opportunity and the $n^{th}$ reference signal transmission opportunity.

In the embodiment, the controller stores desiring information or actual performance information received from the same type communication system as the communication system to which the radio base station belongs. The desiring information is information for identifying a ratio at which the specific frequency band is desirably occupied or a data amount desirably transmitted in the specific frequency band. The actual performance information is information for identifying a ratio or a time at which the specific frequency band is occupied or a data amount transmitted in the specific frequency band. If there is no first component carrier, then the controller selects, on the basis of the stored desiring information or actual performance information in addition to at least one of the stored interference power amount and signal count, as the target component carrier, the one second component carrier from among the plurality of second component carriers.

A radio base station according to an embodiment is a radio base station configured to use a specific frequency band which includes a plurality of component carriers having a predetermined bandwidth and which is allowed to be utilized by a plurality of network operators or a plurality of communication systems. The base station comprises: a controller configured to select, from among the plurality of component carriers, a target component carrier on which a radio terminal should be instructed to perform sensing; and a transmitter configured to transmit, to the radio terminal, a signal to instruct sensing on the target component carrier. The controller selects, as the target component carrier, a first component carrier that satisfies a first condition. The first condition is that an interference power amount falls below a predetermined threshold value.

In the embodiment, the controller performs a storing process of storing carrier identification information for identifying a second component carrier that does not satisfy the first condition but satisfies a second condition, and at least one of an interference power amount in the second component carrier and a signal count of the reference signals used in the second component carrier. The second condition is that the first condition is not satisfied due to interference received from a same type communication system as a communication system to which the radio base station belongs.

In the embodiment, if there is no first component carrier, then the controller selects, on the basis of at least one of the stored interference power amount and signal count, as the target component carrier, the one second component carrier from among the plurality of second component carriers.

In the embodiment, if there are no first component carrier and second component carrier, then the controller limits utilization or addition of a component carrier included in the specific frequency band.

A user terminal according to an embodiment is a user terminal configured to use a specific frequency band which is allowed to be utilized by a plurality of network operators or a plurality of communication systems. The user terminal comprises: a controller configured to measure a frequency subject to measurement included in the specific frequency band. The controller measures a received signal strength indicator of the frequency subject to measurement, if a radio base station does not utilize the frequency subject to measurement as a frequency subject to carrier aggregation, and measures reception quality of a reference signal used in the frequency subject to measurement, if the radio base station utilizes the frequency subject to measurement as the frequency subject to carrier aggregation.

In the embodiment, the frequency subject to measurement is designated by the radio base station.

In the embodiment, the controller notifies the radio base station of the measured received signal strength indicator of the frequency subject to measurement or the measured reception quality of the reference signal.

A user terminal according to an embodiment is a user terminal configured to use a specific frequency band which is allowed to be utilized by a plurality of network operators or a plurality of communication systems. The user terminal comprises: a transmitter configured to transmit, to a radio base station, location information for identifying a location of the user terminal, together with a received signal strength indicator of a frequency subject to measurement included in the specific frequency band.

In the embodiment, if the radio base station does not utilize the frequency subject to measurement as a frequency subject to carrier aggregation, then the transmitter transmits, to the radio base station, the location information together with the received signal strength indicator.

In the embodiment, the location information is reception quality of a signal transmitted by using a carrier band individually assigned to each of the plurality of network operators.

A user terminal according to an embodiment is a user terminal configured to use a specific frequency band which is allowed to be utilized by a plurality of network operators or a plurality of communication systems. The user terminal comprises: a controller configured to measure a frequency subject to measurement included in the specific frequency band. The controller measures a received signal strength indicator of the frequency subject to measurement, if a radio base station does not utilize the frequency subject to measurement or if configuration information of a reference signal used in the frequency subject to measurement is not received, and measures reception quality of the reference signal, if the radio base station utilizes the frequency subject to measurement and if the configuration information is received.

[Embodiment]

Hereinafter, the present embodiment will be described by using an LTE system based on 3GPP standard as an example of a mobile communication system.

(System Configuration)

A system configuration of the LTE system according to the embodiment will be described. FIG. 1 is a configuration diagram of an LTE system according to the present embodiment.

As shown in FIG. 1, the LTE system according to the embodiment includes UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell in a case where the UE 100 is in a RRC connected state) with which a connection is established. Configuration of the UE 100 will be described below.

The E-UTRAN 10 corresponds to a radio access network. The E-UTRAN 10 includes eNBs 200 (evolved Node-Bs). The eNB 200 corresponds to a radio base station. The eNBs 200 are connected mutually via an X2 interface. Configuration of the eNB 200 will be described below.

The eNB 200 forms a cell or a plurality of cells and performs radio communication with the UE 100 that establishes a connection with the cell. The eNB 200, for example, has a radio resource management (RRM) function, a function of routing user data, and a measurement control function for mobility control and scheduling. The "cell" is used as a term indicating a minimum unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME is a network node that performs various mobility controls and the like, for the UE 100. The S-GW is a network node that performs control to transfer user data. The MME/S-GW 300 is connected to the eNB 200 via an S1 interface. It is noted that the E-UTRAN 10 and the EPC 20 constitute a network of the LTE system.

Figure 2:
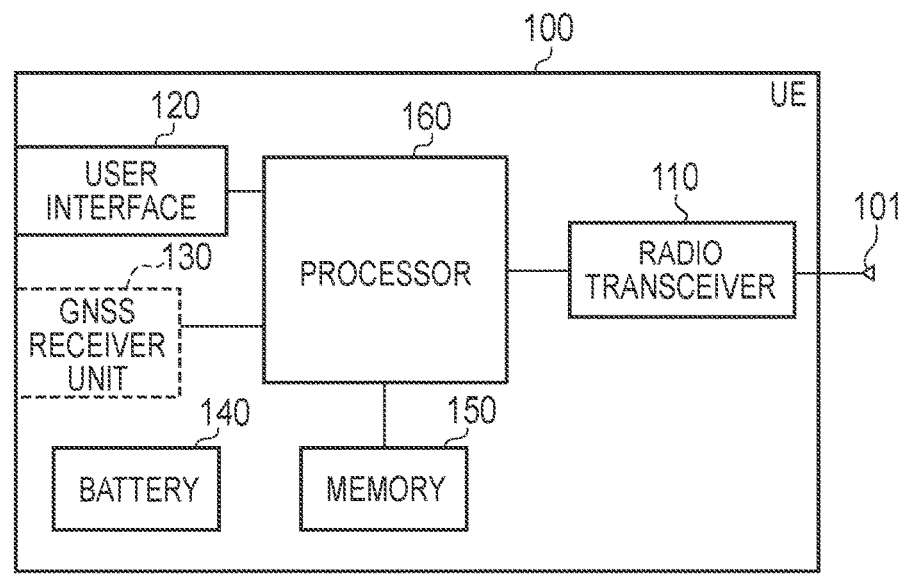
FIG. 2 is a block diagram of a UE 100 according to the embodiment.

FIG. 2 is a block diagram of the UE 100. As shown in FIG. 2, the UE 100 includes a plurality of antennas 101, a radio transceiver 110, a user interface 120, GNSS (Global Navigation Satellite System) receiver 130, a battery 140, a memory 150, and a processor 160. The memory 150 and the processor 160 configure a control unit (controller). The radio transceiver 110 and the processor 160 configure a transmission unit (transmitter) and a reception unit (receiver). The UE 100 may not have the GNSS receiver 130. Furthermore, the memory 150 may be integrally formed with the processor 160, and this set (that is, a chip set) may be called a processor.

The antennas 101 and the radio transceiver 110 are used to transmit and receive a radio signal. The radio transceiver 110 converts a baseband signal (transmission signal) output from the processor 160 into the radio signal, and transmits the radio signal from the antenna 101. Furthermore, the radio transceiver 110 converts the radio signal received by the antenna 101 into the baseband signal (reception signal), and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the receiving operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
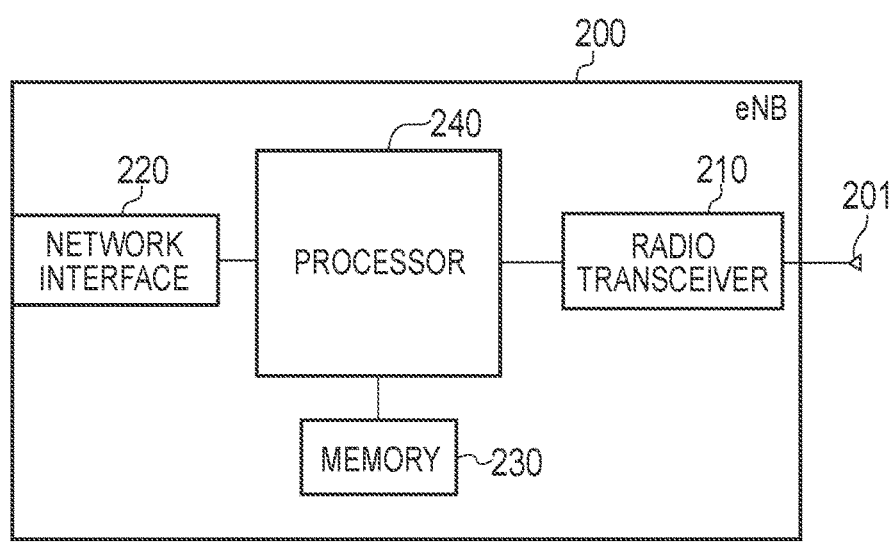
FIG. 3 is a block diagram of an eNB 200 according to the embodiment.

FIG. 3 is a block diagram of the eNB 200. As shown in FIG. 3, the eNB 200 includes a plurality of antennas 201, a radio transceiver 210, a network interface 220, a memory 230, and a processor 240. The memory 230 and the processor 240 constitute a control unit (controller). The radio transceiver 210 (and/or the network interface 220) and the processor 160 configure a transmission unit (transmitter) and a reception unit (receiver). In addition, the memory 230 is integrated with the processor 240, and this set (that is, a chipset) may be called a processor.

The antennas 201 and the radio transceiver 210 are used to transmit and receive a radio signal. The radio transceiver 210 converts the baseband signal (transmission signal) output from the processor 240 into the radio signal, and transmits the radio signal from the antenna 201. Furthermore, the radio transceiver 210 converts the radio signal received by the antenna 201 into the baseband signal, and outputs the baseband signal (reception signal) to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
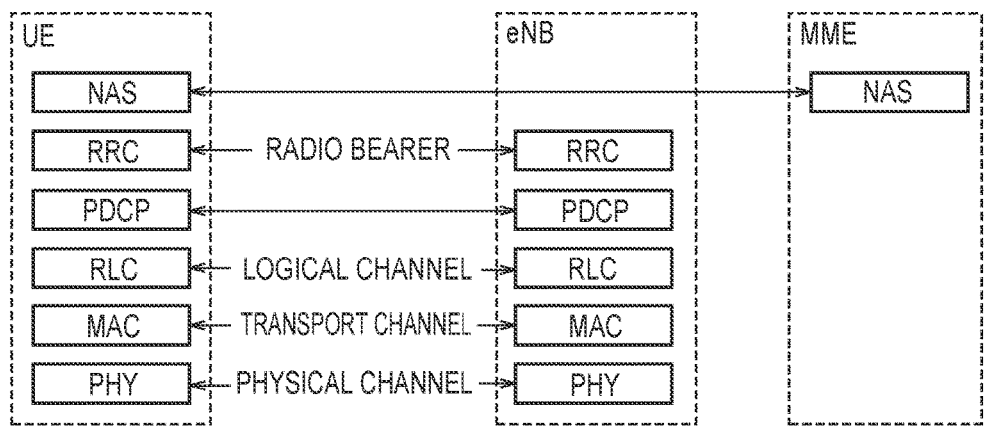
FIG. 4 is a protocol stack diagram of a radio interface according to the embodiment.

FIG. 4 is a protocol stack diagram of a radio interface in the LTE system. As shown in FIG. 4, the radio interface protocol is classified into a layer 1 to a layer 3 of an OSI reference model, wherein the layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control information are transmitted through the physical channel.

The MAC layer performs priority control of data, a retransmission process by hybrid ARQ (HARQ), a random access procedure, and the like. Between the MAC layer of the UE 100 and the MAC layer of the eNB 200, user data and control information are transmitted via a transport channel. The MAC layer of the eNB 200 includes a transport format of an uplink and a downlink (a transport block size, a modulation and coding scheme (MCS) and the like) and a MAC scheduler to decide a resource block to be assigned to UEs 100.

The RLC layer transmits data to an RLC layer of a reception side by using the functions of the MAC layer and the PHY layer. Between the RLC layer of the UE 100 and the RLC layer of the eNB 200, user data and control information are transmitted via a logical channel.

The PDCP layer performs header compression and decompression, and encryption and decryption. In addition, it is noted that a transmission entity for transmitting a data unit (PDCP PDU) or a reception entity for receiving a data unit (PDCP PDU) is formed in the PDCP layer.

The RRC layer is defined only in a control plane handling control information. Between the RRC layer of the UE 100 and the RRC layer of the eNB 200, control information (an RRC message) for various types of setting is transmitted. The RRC layer controls the logical channel, the transport channel, and the physical channel in response to establishment, re-establishment, and release of a radio bearer. When there is a connection (an RRC connection) between the RRC of the UE 100 and the RRC of the eNB 200, the UE 100 is in a RRC connected state, and when there is not a connection (the RRC connection) between the RRC of the UE 100 and the RRC of the eNB 200, the UE 100 is in an RRC idle state.

NAS (Non-Access Stratum) layer positioned above the RRC layer performs session management, mobility management and the like.

Figure 5:
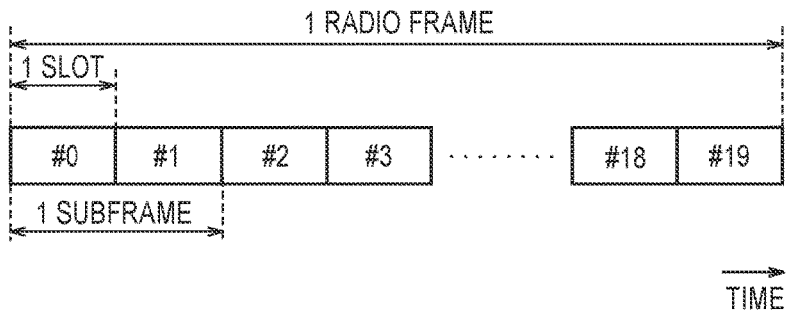
FIG. 5 is a configuration diagram of a radio frame used in the LTE system according to the embodiment.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As shown in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in a frequency direction. A resource element (RE) is configured by one symbol and one subcarrier. Further, of the radio resources (time-frequency resources) assigned to the UE 100, it is possible to identify a frequency resource by a resource block and identify a time resource by a subframe (or a slot).

(Application Scene)

Figure 6:
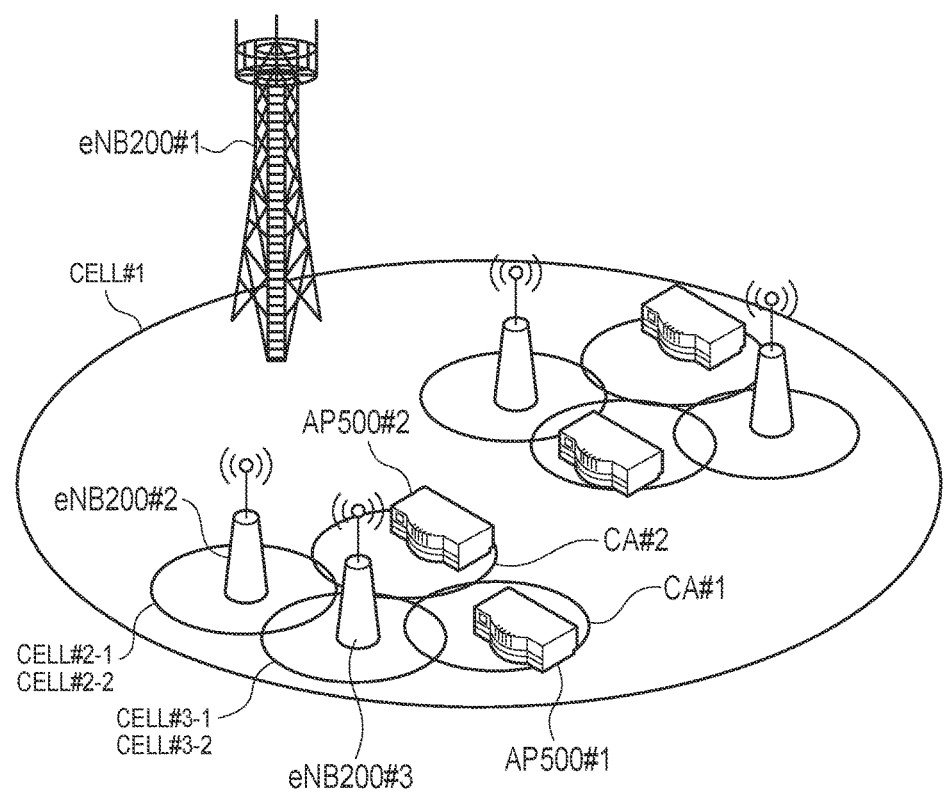
FIG. 6 is a diagram for describing an application scene according to the embodiment.

An application scene will be described, below. FIG. 6 is a diagram for describing an application scene according to the embodiment.

As shown in FIG. 6, the mobile communication system has a plurality of eNBs (an eNB 200 #1, an eNB 200 #2, and an eNB 200 #3, for example) and a plurality of APs (an AP 500 #1 and an AP 500 #2).

The eNB 200 #1 is the eNB 200 installed by a network operator, for example. The eNB 200 #1 has a cell #1 as a radio communication area. In the cell #1, a licensed band requiring a license is used. The licensed band is an example of a band assigned to the network operator (hereinafter, a carrier band).

The eNB 200 #2 and the eNB 200 #3 are the eNBs 200 set by the network operator. However, the eNB 200 #2 may be installed by a third person different from the network operator. The eNB 200 #2 has, as the radio communication area, a cell #2-1 and a cell #2-2, and the eNB 200 #3 has, as the radio communication area, a cell #3-1 and a cell #3-2. In the cell #2-1 and the cell #3-1, in much the same way as in the cell #1, the carrier band is used. On the other hand, in the cell #2-2 and the cell #3-2, an unlicensed band not requiring a license is used. The unlicensed band is an example of a specific frequency band which is allowed to be used by a plurality of network operators or a plurality of communication systems.

The AP 500 #1 and the AP 500 #2 are access points used in Wi-Fi (registered trademark), Bluetooth (registered trademark), and the like. The AP 500 #1 has, as the radio communication area, a coverage area CA #1, and the AP 500 #2 has, as the radio communication area, a coverage area CA #2. In the coverage area CA #1 and the coverage area CA #2, in much the same way as in the cell #2-2 and the cell #3-2, the unlicensed band is used.

Here, the specific frequency band includes a plurality of component carriers having a predetermined bandwidth. As shown in FIG. 7, in each of the cell #2-2, the cell #3-2, the coverage area CA #1, and the coverage area CA #2, out of component carriers (hereinafter, referred to as "CC") included in the specific frequency band, one or more CCs are used.

In such a precondition, the embodiment assumes a case where in order to enable the UE 100 to utilize the specific frequency band, the eNB 200 (here, the eNB 200 #2 or the eNB 200 #3) uses the specific frequency band to transmit a reference signal.

The reference signal includes, as described later, a cell-specific reference signal (CRS), a primary synchronization signal (PSS), and a secondary synchronization signal (SSS). The reference signal may include channel quality information (CSI-RS), in addition to the CRS, the PSS, and the SSS. It is noted that the CRS, the CSI-RS, the PSS, and the SSS may be transmitted at the same timing or transmitted at respectively different timings.

The CRS and the CSI-RS are signals used by the UE 100 to transmit a feedback (CQI: Channel Quality Indicator, for example) used for assignment of data communication in which the specific frequency band is used. More particularly, the UE 100 measures the reception quality of the CRS, and sends back, as a feedback, information indicating the measured reception quality to the eNB 200. The PSS and the SSS are signals used by the UE 100 to synchronize with the eNB 200.

Specifically, the processor 240 of the eNB 200 configures a controller configured to perform sensing on each of the plurality of component carriers and to select, from among the plurality of component carriers, a target component carrier in which the reference signal used for the specific frequency band should be transmitted. The radio transceiver 210 of the eNB 200 configures a transmitter configured to use the target component carrier to transmit the reference signal.

Firstly, if a first component carrier that satisfies a first condition is detected in the sensing, then the processor 240 selects, as the target component carrier, the first component carrier. If a second component carrier that does not satisfy the first condition but satisfies a second condition is detected in the sensing, then the processor 240, the processor 240 performs a storing process of storing: carrier identification information for identifying the second component carrier; and at least one of an interference power amount obtained from the sensing and a signal count of the reference signals used in the second component carrier.

It is noted that the signal count of the reference signals is a signal count of reference signals received from another cell, and means the number of other cells transmitting the reference signals. As described above, the cell includes a unique CRS, and thus, it is possible to identify the number of other cells with the CRS.

The first condition is that the interference power amount obtained from the sensing falls below a predetermined threshold value. The second condition is that the first condition is not satisfied due to the interference received from a same type communication system as the communication system to which the eNB 200 belongs.

Here, in examples shown in FIG. 6 and FIG. 7, a case is assumed where the cell #2-2 selects the target component carrier. In such a case, a state where the first condition is satisfied is a state where the interference power amounts received from all of the cell #3-2, the AP 500 #1, and the AP 500 #2 fall below the predetermined threshold value. A state where the second condition is satisfied is a state where the first condition is not satisfied due to the interference received from the cell #3-2. For example, if the interference power amount received from the cell #3-2 is equal to or more than the above-described predetermined threshold value, then the cell #2-2 may determine that the first condition is not satisfied due to the interference received from the cell #3-2.

Here, a reason why the second condition is thus mentioned above is that the interference received from the same type communication system as the communication system to which the eNB 200 belongs may possibly be adjusted by the eNB 200 by using information notified on an X2 interface, an S1 interface, or an air interface. It is noted that the information notified on the air interface may include broadcast information notified by a broadcast-type distribution method. Alternatively, such interference may possibly be adjusted by the eNB 200 by using a message defined by another standardization technique other than the LTE. It should be noted that the interference received from a communication system different in type from the communication system to which the eNB 200 belongs is not highly likely to be adjusted by the eNB 200 by using the information notified on the X2 interface or the S1 interface.

Secondly, if the first component carrier is not detected, then the processor 240 selects the target component carrier, on the basis of at least one of the interference power amount stored and the signal count, from the second component carrier. For example, the processor 240 selects, as the target component carrier, a second component carrier having the smallest interference power amount stored. Alternatively, the processor 240 selects, as the target component carrier, a second component carrier having the smallest signal count stored. Alternatively, the processor 240 selects, as the target component carrier, a second component carrier having the most preferable weighting result after performing weighting the stored interference power amount and signal count.

Thirdly, if the first component carrier and the second component carrier are not detected, then the processor 240 abandons the utilization or addition of the component carrier included in the specific frequency band.

Fourthly, the processor 240 determines, on the basis of whether or not the component carrier included in the specific frequency band is already used, whether or not to perform a storing process. More particularly, if the component carrier included in the specific frequency band is already utilized, then the processor 240 may abandon, without performing the storing process, the addition of the component carrier. On the other hand, if the component carrier included in the specific frequency band is not utilized, then the processor 240 may perform the storing process to still select, as the target component carrier, the second component carrier.

Fifthly, the radio transceiver 210 of the eNB 200 configures a receiver configured to receive a feedback sent back from the UE 100, in response to the reference signal transmitted by using the target component carrier. The processor 240 determines, for the UE 100, on the basis of the feedback, whether or not to utilize the target component carrier. For example, the processor 240 determines, on the basis of the feedback, whether or not to perform assignment of data communication in which the target component carrier is used. The feedback is generated by the UE 100, on the basis of the CRS included in the reference signal, as described above. If the feedback indicating a resource block in which the interference is smaller than a threshold value is received, then the processor 240 assigns the data communication to the resource block in which the interference is smaller than a threshold value.

(Reference Signal)

Figure 8:
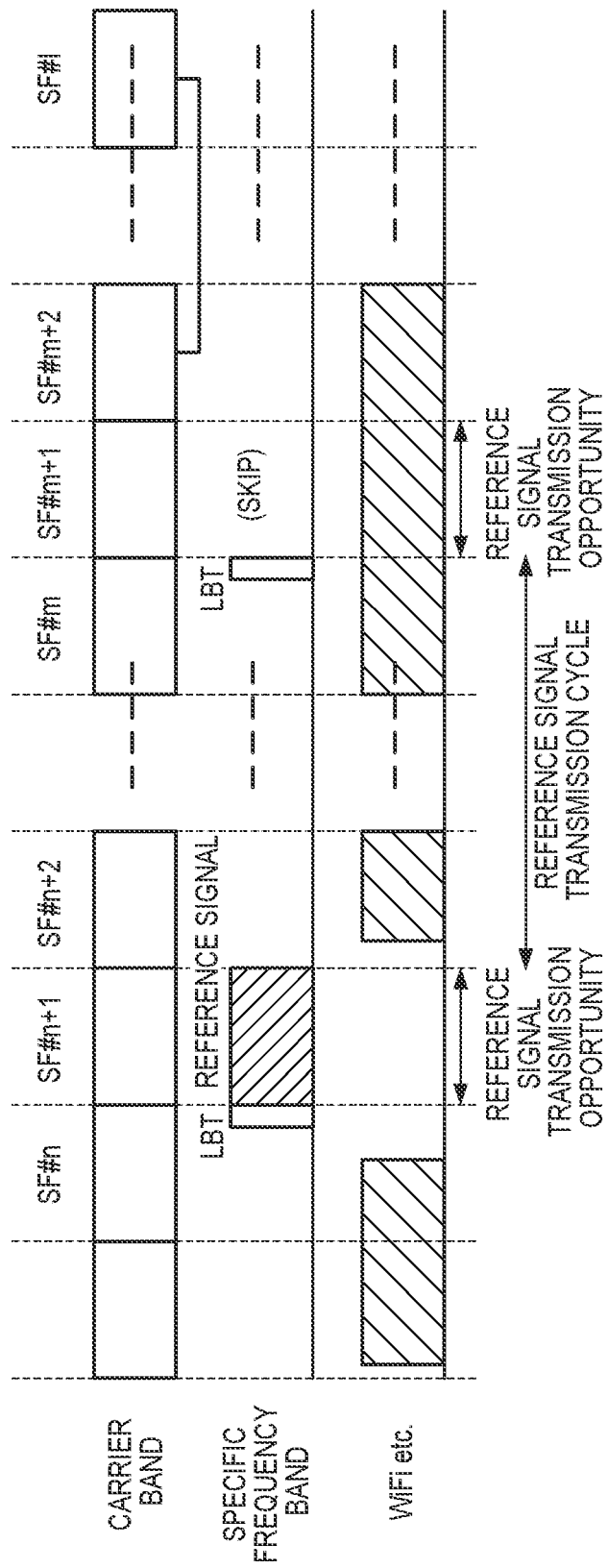
FIG. 8 is a diagram for describing an example of a reference signal according to the embodiment.
Figure 9:
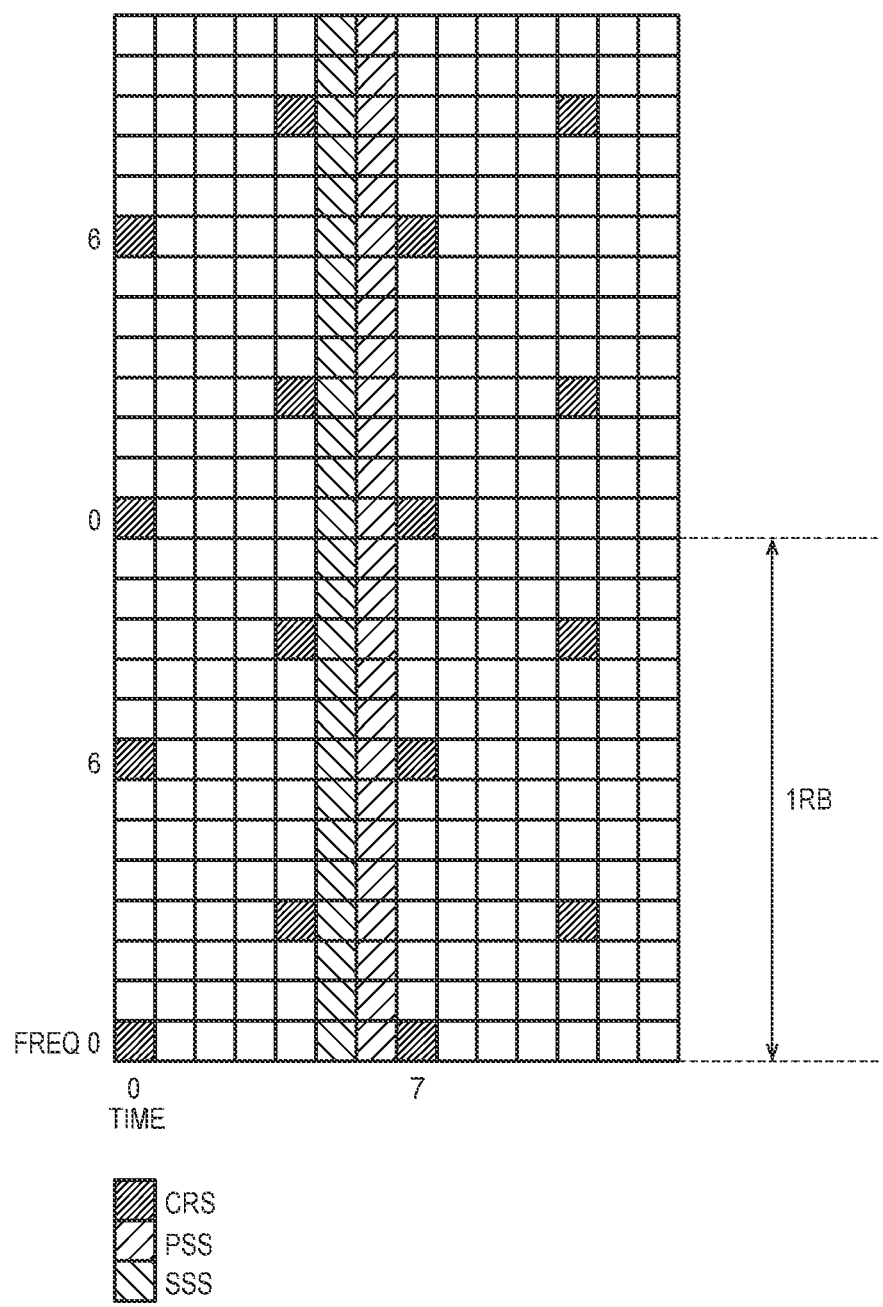
FIG. 9 is a diagram for describing an example of the reference signal according to the embodiment.

An example of the reference signal will be described, below. FIG. 8 and FIG. 9 are diagrams for describing an example of the reference signal according to the embodiment.

As shown in FIG. 8, a case is shown as an example where in a subframe #SFn+1 and a subframe #SFm+1 of a system in which the carrier band is used, an opportunity in which the reference signal is transmitted (hereinafter, "reference signal transmission opportunity") is assigned. As shown in FIG. 8, before the reference signal is transmitted, a period during which the sensing is performed (LBT: Listen Before Talk) is assigned. Further, the reference signal is transmitted by using one subframe.

Here, the reference signal includes, as shown in FIG. 9, a cell-specific reference signal (CRS), a primary synchronization signal (PSS), and a secondary synchronization signal (SSS). It is noted that the reference signal may include channel quality information (CSI-RS), in addition to the CRS, the PSS, and the SSS. The CRS (or the CSI-RS) is arranged to be dispersed across an entire resource element included in the reference signal transmission opportunity. On the other hand, the PSS and the SSS are arranged to continue along a frequency axis (freq) direction. The PSS and the SSS are arranged at a substantially center of the subframe, in a time axis (time) direction.

In such a case, as shown in FIG. 8, in the LBT of a subframe #SFn, no interference such as WiFi is observed, and thus, the reference signal is transmitted in the subframe #SFn+1. That is, in the subframe #SFn+1, the utilization or the addition of the component carrier is attempted. On the other hand, in a subframe #Sm, interference such as WiFi is observed, and thus, the reference signal is not transmitted in the subframe #SFm+1. That is, in the subframe #Sm, the utilization or the addition of the component carrier is abandoned.

(Communication Method)

Figure 10:
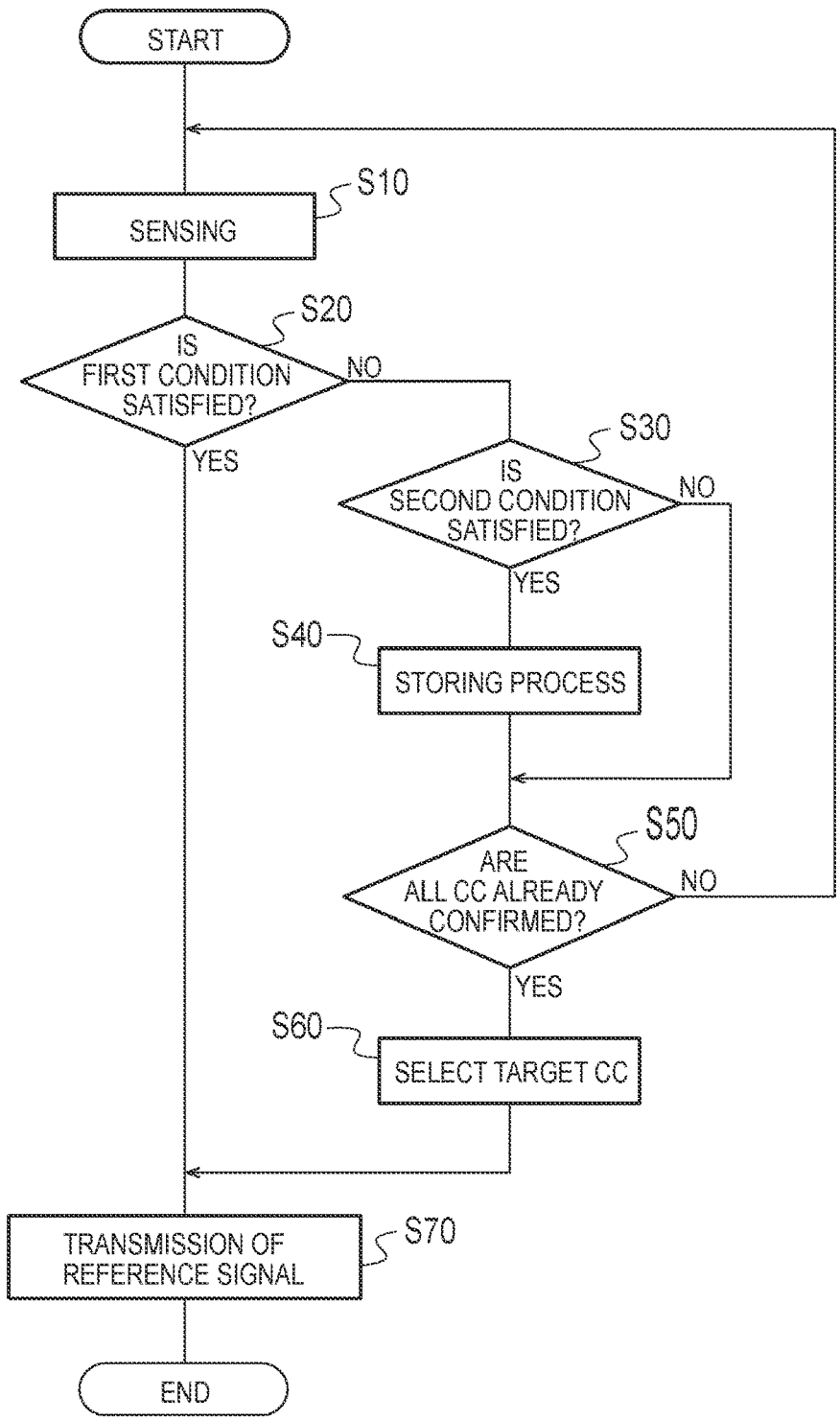
FIG. 10 is a flowchart showing a communication method according to the embodiment.

A communication method according to the embodiment will be described, below. FIG. 10 is a flowchart showing the communication method according to the embodiment. It should be noted that the flow shown in FIG. 10 is performed by the eNB 200.

As shown in FIG. 10, in step S10, the eNB 200 performs sensing on each of a plurality of component carriers included in the specific frequency band. Specifically, the eNB 200 selects a CC subject to sensing from among the plurality of component carriers, and performs the sensing on the selected CC. The sensing is performed in the LBT shown in FIG. 8, for example.

In step S20, the eNB 200 determines whether or not the CC subject to sensing satisfies the first condition. If a determination result is YES, then the step moves to a process of step S70. If the determination result is NO, then the step moves to a process of step S30. It is noted that, as described above, the first condition is that the interference power amount obtained from the sensing falls below a predetermined threshold value.

Here, if the CC subject to sensing satisfies the first condition, then the CC subject to sensing is the above-described first component carrier. That is, the CC subject to sensing is selected as the target component carrier.

In step S30, the eNB 200 determines whether or not the CC subject to sensing satisfies the second condition. If the determination result is YES, then the step moves to a process of step S40. If the determination result is NO, then the step moves to a process of step S50. It is noted that, as described above, the second condition is that the first condition is not satisfied due to the interference received from the same type communication system as the communication system to which the eNB 200 belongs.

Here, if the CC subject to sensing satisfies the second condition, then the CC subject to sensing is the above-described second component carrier. That is, information on the CC subject to sensing (at least one of the carrier identification information or the signal count) is stored.

In step S40, the eNB 200 performs a storing process of storing: the carrier identification information for identifying the CC subject to sensing; and at least one of the interference power amount obtained from the sensing and the signal count of the reference signals used in the CC subject to sensing.

In step S50, the eNB 200 determines whether or not the sensing on all the component carriers included in the specific frequency band is completed. If the determination result is YES, then the step moves to a process of step S60. If the determination result is NO, then the step returns to the process of step S10.

In step S60, the eNB 200 selects the target component carrier, on the basis of at least one of the stored interference power amount and signal count, from the second component carrier. A method of selecting the target component carrier is as described above.

In step S70, the eNB 200 uses the target component carrier to transmit the reference signal.

(Operation and Effect)

If the first component carrier that satisfies the first condition is detected in the sensing, then the eNB 200 (processor 240) according to the embodiment selects, as the target component carrier, the first component carrier. That is, by using, as the target component carrier, the first component carrier assumed to have a small interference, it is possible to increase a possibility for the reference signal to reach the UE 100.

If the second component carrier that does not satisfy the first condition but satisfies the second condition is detected in the sensing, then the eNB 200 (processor 240) according to the embodiment performs a storing process of storing: the carrier identification information for identifying the second component carrier; and at least one of the interference power amount obtained from the sensing and the signal count of the reference signals used in the second component carrier. That is, even when the first component carrier that satisfies the first condition is not detected, the eNB 200 (processor 240) may still select the target component carrier from the second component carrier.

As described above, the eNB 200 is capable of preferably using the unlicensed band for a technology used in the LTE system (LAA: Licensed Assisted Access). More particularly, the eNB 200 is capable of preferably using the unlicensed band for the carrier aggregation between the licensed cell (L-Cell: Licensed LTE Cell) and the unlicensed cell (U-Cell: Unlicensed LTE Cell).

[First Modification]

A first modification of the embodiment will be described, below. A difference from the embodiment will be described, below.

In the embodiment, the LBT and the reference signal transmission opportunity continue timewise. On the other hand, in the first modification, the LBT and the reference signal transmission opportunity do not continue timewise. In such a case, the eNB 200 (radio transceiver 210) continues transmission of a predetermined signal during a period between an end timing of performing the sensing and a start timing of transmitting the reference-signal.

Figure 11:
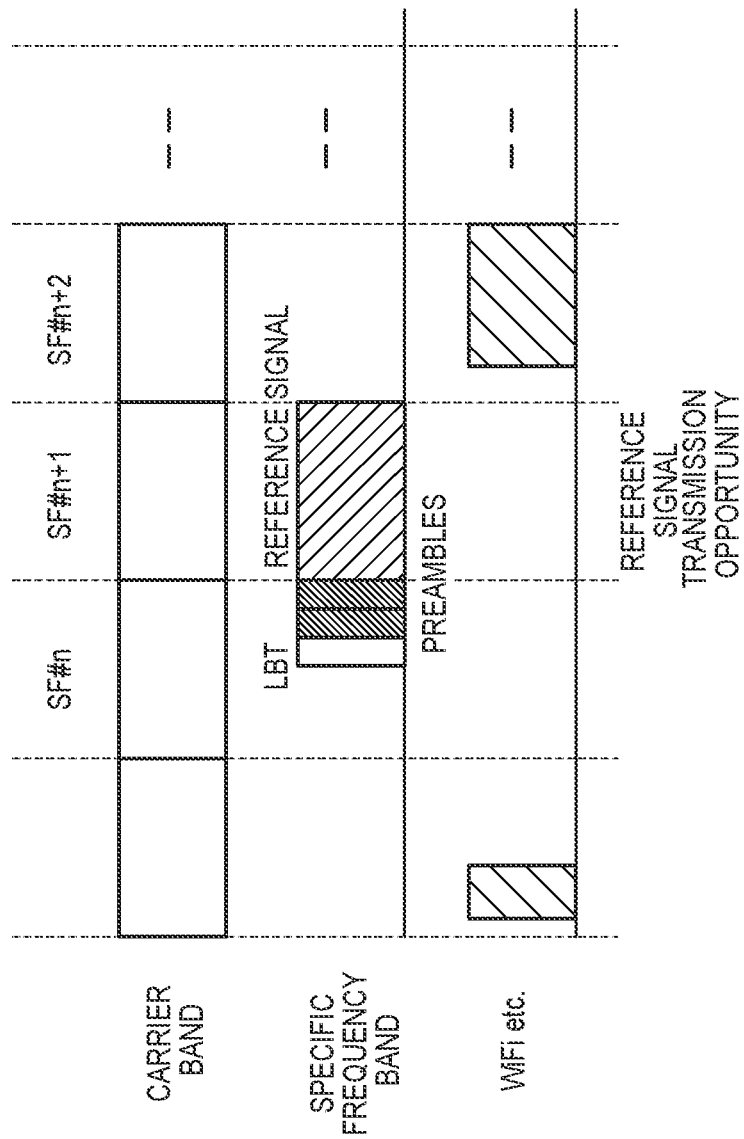
FIG. 11 is a diagram for describing an example of a reference signal according to a first modification of the embodiment.

Specifically, if the LBT and the reference signal transmission opportunity do not continue timewise as shown in FIG. 11, the eNB 200 continues transmission of a predetermined signal using the target component carrier, during a period between an LBT end timing and a transmission start timing of the reference signal transmission opportunity. The predetermined signal may be any signal; and may be a well-known preamble, for example. Alternatively, the predetermined signal may be a synchronization signal different in sequence from the PSS and the SSS; and may be a predetermined reference signal.

Thus, when the transmission of the predetermined signal is continued, a possibility that the predetermined signal acts as an interference signal to another eNB 200 and the target component carrier is thus utilized by the other eNB 200, may be diminished.

[Second Modification]

A second modification of the embodiment will be described, below. A difference from the embodiment will be described, below.

Figure 12:
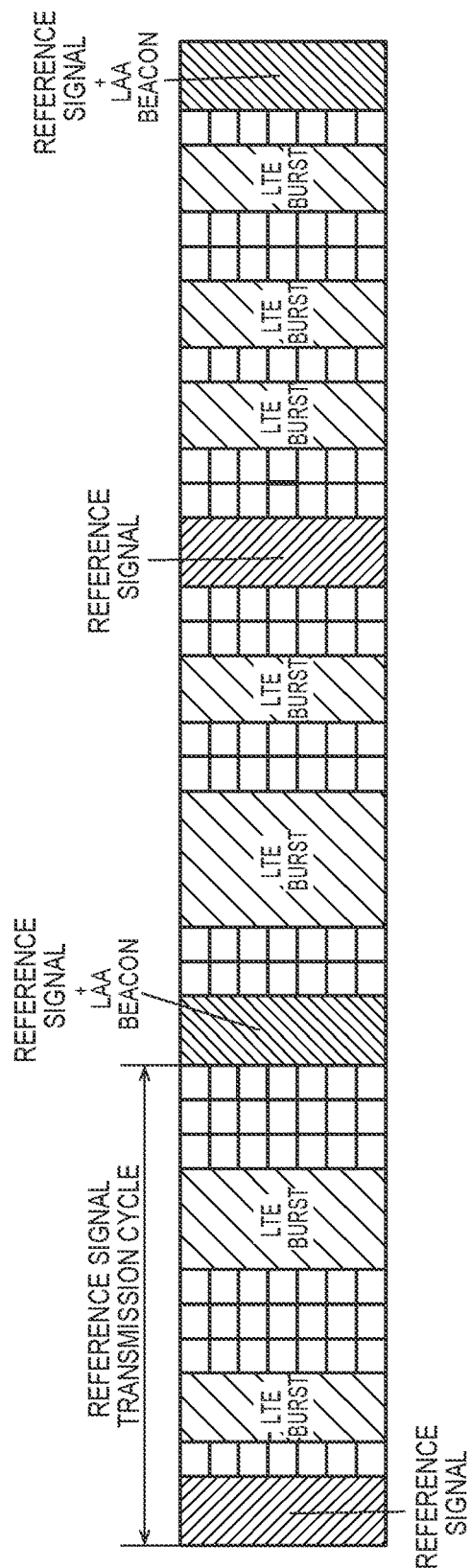
FIG. 12 is a diagram for describing an example of a reference signal according to a second modification of the embodiment.

In the second modification, as shown in FIG. 12, a case is assumed where the reference signal transmission opportunity is assigned for each reference signal transmission cycle, and in the reference signal transmission opportunity, other information (hereinafter, "LAA Beacon"), together with the reference signal, is transmittable.

Figure 13:
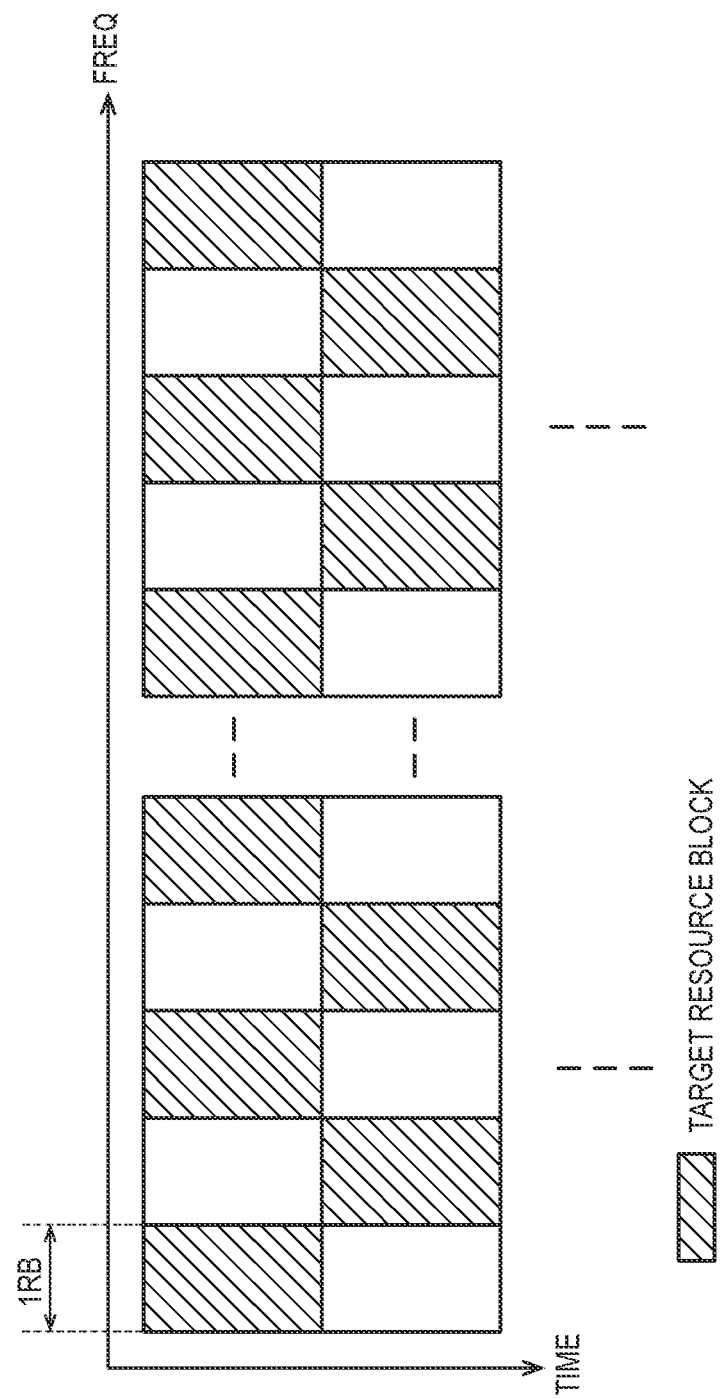
FIG. 13 is a diagram for describing an example of the reference signal according to the second modification of the embodiment.

In such a case, the eNB 200 (radio transceiver 210) may use only some of the target resource blocks from among resource blocks configuring the target component carrier to transmit the reference signal, as shown in FIG. 13. More particularly, the eNB 200 uses, in the reference signal transmission opportunity (in one subframe) of the target component carrier, only some of the target resource blocks to transmit the reference signal. The reference signal is transmitted.

In such a case, the eNB 200 (radio transceiver 210) preferably transmit a pattern indicating a location of the target resource block in the resource block configuring the target component carrier. The pattern indicating the location of the target resource block is preferably transmitted by using the above-described LAA Beacon. That is, the eNB 200 (radio transceiver 210) transmits the pattern indicating the location of the target resource block, in the same subframe as the subframe in which the reference signal should be transmitted (reference signal transmission opportunity).

It is noted that the location of the target resource block may be previously determined. Alternatively, the location of the target resource block may be selected by the eNB 200 (processor 240).

[Third Modification]

A third modification of the embodiment will be described, below. A difference from the embodiment will be described, below.

In the third modification, the eNB 200 (radio transceiver 210) transmits desiring information for identifying a ratio at which the specific frequency band is desirably occupied (desired occupation ratio) or a data amount desirably transmitted in the specific frequency band (desired transmission amount) in a period between an $n^{th}$ reference signal transmission opportunity and an $n+k^{th}$ (where k is an integer being equal to or more than 1) reference signal transmission opportunity, in the $n^{th}$ reference signal transmission opportunity. Alternatively, the eNB 200 (radio transceiver 210) may transmit the desired occupation ratio or the desired transmission amount within a transmission interval of the above-described LAA Beacon.

That is, the eNB 200 transmits the desiring information to thereby notify the other eNB 200 of intention of utilizing the specific frequency band in the nearest future. Such desiring information may be used as a basis for determining whether or not the other eNB 200 utilizes the specific frequency band.

Alternatively, the eNB 200 (radio transceiver 210) transmits actual performance information for identifying a ratio (occupation actual performance ratio) or a time (occupation actual performance time) at which the specific frequency band is occupied or a data amount transmitted in the specific frequency band (transmission actual performance amount) in a period between a predetermined timing before an $n^{th}$ reference signal transmission opportunity and the $n^{th}$ reference signal transmission opportunity, in the $n^{th}$ reference signal transmission opportunity. The predetermined timing before the $n^{th}$ reference signal transmission opportunity may be an end timing of an $n-k^{th}$ (where k is an integer being equal to or more than 1) reference signal transmission opportunity, and may be a transmission timing of the LAA Beacon before the $n^{th}$ reference signal transmission opportunity.

That is, the eNB 200 transmits the actual performance information to thereby notify the other eNB 200 of the fact of having utilized the specific frequency band in the nearest past. Such actual performance information may be used as a basis for determining whether or not the other eNB 200 utilizes the specific frequency band. It should be noted that if the specific frequency band is utilized in the nearest past, the specific frequency band is highly likely utilized also in the nearest future.

It is noted that the actual performance information may be information indicating a load amount of the eNB 200 in the $n^{th}$ reference signal transmission opportunity. The information indicating the load amount may be a value directly indicating the load amount (numerical value of an actual load amount), and may be a value indirectly indicating the load amount (identifier such as "High", "Middle", "Low", and the like).

[Fourth Modification]

A third modification of the embodiment will be described, below. A difference from the third modification will be described, below.

Specifically, in the third modification, the case is described where the eNB 200 transmits the desiring information or the actual performance information to the other eNB 200. On the other hand, in the fourth modification, a case will be examined where the eNB 200 receives the desiring information or the actual performance information from the other eNB 200.

In the fourth modification, the eNB 200 (processor 240) stores therein, in the storing process, the desiring information or the actual performance information received from the same type communication system as the communication system to which the eNB 200 belongs. If the first component carrier is not detected, then the processor 240 selects the target component carrier from the second component carrier, on the basis of the stored desiring information or actual performance information in addition to at least one of the stored interference power amount and signal count.

Specifically, the processor 240 preferentially selects, as the target component carrier, a component carrier having a low desired occupation ratio included in the desiring information. Alternatively, the processor 240 preferentially selects, as the target component carrier, a component carrier having a small desired transmission amount included in the desiring information. Alternatively, the processor 240 preferentially selects, as the target component carrier, a component carrier having a low occupation actual performance ratio included in the actual performance information. Alternatively, the processor 240 preferentially selects, as the target component carrier, a component carrier having a short occupation actual performance time included in the actual performance information. Alternatively, the processor 240 preferentially selects, as the target component carrier, a component carrier having a small transmission actual performance amount included in the actual performance information.

Here, if there is no second component carrier in which the stored interference power amount is smaller than a threshold value, then the processor 240 may refer to the desiring information or the actual performance information. Likewise, if there is no second component carrier in which the stored signal count is smaller than a threshold value, then the processor 240 may refer to the desiring information or the actual performance information.

[Fifth Modification]

A fifth modification of the embodiment will be described, below. A difference from the embodiment will be described, below.

In the embodiment, the selection of the target component carrier in order to transmit the reference signal is described. On the other hand, in the fifth modification, a selection of a component carrier subject to sensing on which the UE 100 should be instructed to perform sensing, will be examined.

Specifically, the processor 240 of the eNB 200 configures a controller configured to perform the sensing on each of the plurality of component carriers and to select, from among the plurality of component carriers, the component carrier subject to sensing on which the UE 100 should be instructed to perform sensing. The radio transceiver 210 of the eNB 200 configures a transmitter configured to transmit, to the UE 100, a signal to instruct sensing on the component carrier subject to sensing.

Firstly, if the first component carrier that satisfies the first condition is detected in the sensing, then the processor 240 selects, as the component carrier subject to sensing, the first component carrier. If the second component carrier that does not satisfy the first condition but satisfies the second condition is detected in the sensing, then the processor 240 performs the storing process of storing: the carrier identification information for identifying the second component carrier; and at least one of the interference power amount obtained from the sensing and the signal count of the reference signals used in the second component carrier.

Secondly, if the first component carrier is not detected, then the processor 240 selects the component carrier subject to sensing, on the basis of at least one of the stored interference power amount and signal count, from the second component carrier. A method of selecting the component carrier subject to sensing is similar to the method of selecting the target component carrier.

Thirdly, if the first component carrier and the second component carrier are not detected, then the processor 240 abandons the utilization or addition of the component carrier included in the specific frequency band.

(Communication Method)

Figure 14:
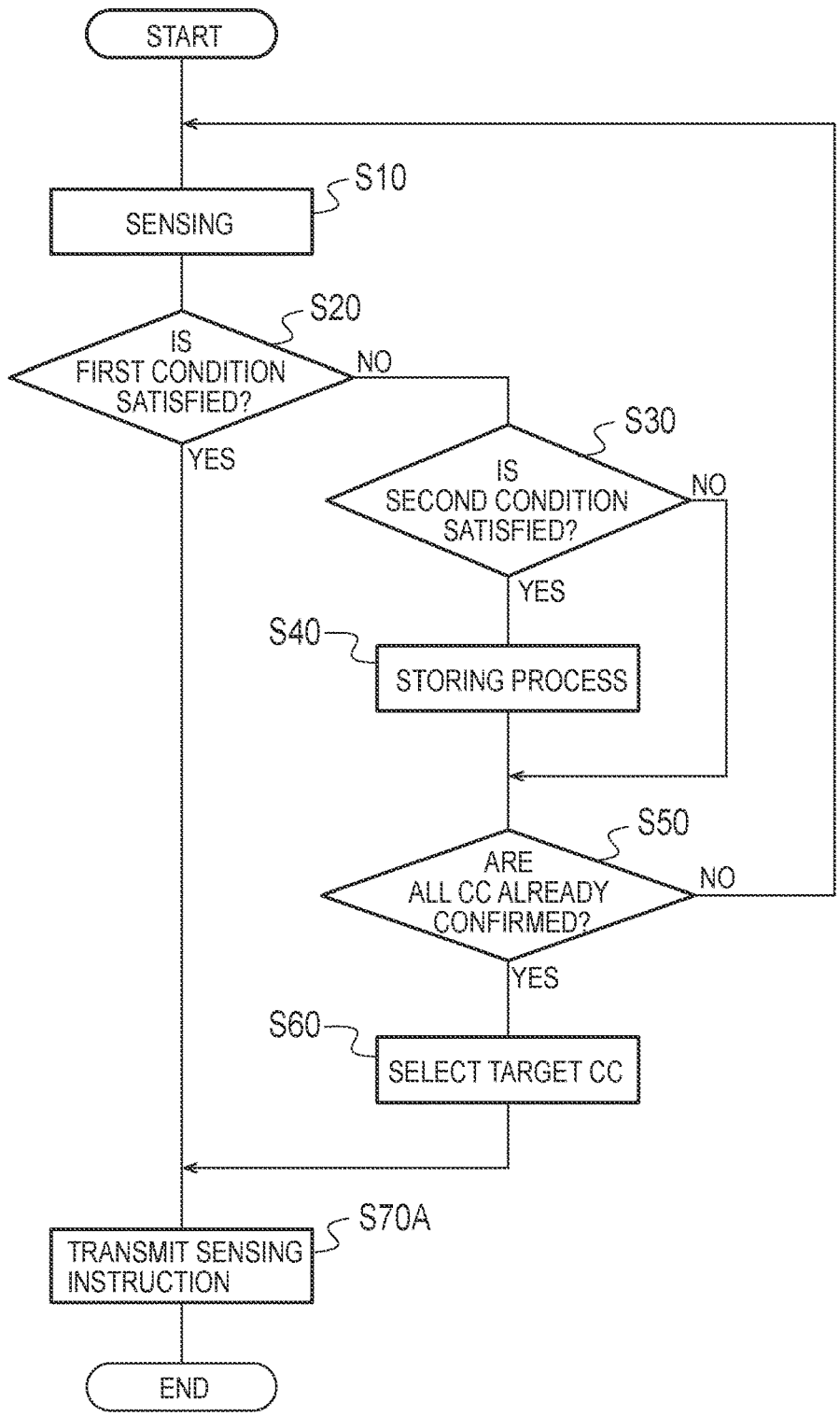
FIG. 14 is a flowchart showing a communication method according to a fifth modification of the embodiment.

A communication method according to the fifth modification will be described, below. FIG. 14 is a flowchart showing a communication method according to the fifth modification. It should be noted that the flow shown in FIG. 14 is performed by the eNB 200. In FIG. 14, processes similar to those in FIG. 10 are referenced with like step numbers. Accordingly, a description of the same processes as those of FIG. 10 will be omitted. However, it should be noted that the target component carrier should be replaced by the component carrier subject to sensing.

As shown in FIG. 14, in step S70A, the eNB 200 transmits, to the UE 100, a signal to instruct sensing on the component carrier subject to sensing.

It is noted that the UE 100 performs, in response to reception of the signal to instruct the sensing, the sensing on the component carrier subject to sensing, and transmits a sensing result to the eNB 200. The eNB 200 selects the above-described target component carrier, on the basis of the sensing result.

That is, in the fifth modification, as a first step, the eNB 200 narrows down a candidate target component carrier, and as a second step, the UE 100 performs the sensing on the candidate target component carrier. Therefore, as compared to a case where the UE 100 performs the sensing on all the component carriers, a load of the UE 100 is alleviated. Further, by the selection of the target component carrier, the sensing result of the UE 100 is referred to, and thus, it is possible to select a more appropriate target component carrier than in the embodiment.

(Operation and Effect)

If the first component carrier that satisfies the first condition is detected in the sensing, then the eNB 200 (processor 240) according to the fifth modification selects the first component carrier as the component carrier subject to sensing. That is, when the first component carrier to be assumed to have a small interference is utilized as the component carrier subject to sensing, it is possible to present to the UE 100 an appropriate candidate as the component carrier on which the UE 100 should perform the sensing.

If the second component carrier that does not satisfy the first condition but satisfies the second condition is detected in the sensing, then the eNB 200 (processor 240) according to the fifth modification performs the storing process of storing: the carrier identification information for identifying the second component carrier; and at least one of the interference power amount obtained from the sensing and the signal count of the reference signals used in the second component carrier. That is, even when the first component carrier that satisfies the first condition is not detected, the eNB 200 (processor 240) may still select, from the second component carrier, the target component carrier subject to sensing.

As described above, the eNB 200 is capable of preferably using the unlicensed band for a technology used in the LTE system (LAA: Licensed Assisted Access). More particularly, the eNB 200 is capable of preferably using the unlicensed band for the carrier aggregation between the licensed cell (L-Cell: Licensed LTE Cell) and the unlicensed cell (U-Cell: Unlicensed LTE Cell).

[Sixth Modification]

A sixth modification of the embodiment will be described, below. A difference from the embodiment will be described, below.

Specifically, in the embodiment, the eNB 200 selects the target component carrier, and uses the selected target component carrier to transmit the reference signal. On the other hand, in the sixth modification, an operation of the UE 100 configured to measure a frequency subject to measurement included in the specific frequency band, will be examined. It is noted that similarly to the embodiment, the specific frequency band may include the plurality of component carriers having a predetermined bandwidth. In such a case, it should be noted that the frequency subject to measurement may be replaced by a component carrier subject to measurement.

As a precondition of the sixth modification, the eNB 200 is configured to transmit a reference signal in a frequency used as a subject of carrier aggregation, out of frequencies included in the specific frequency band. On the other hand, the eNB 200 is configured to not transmit a reference signal in a frequency not used as a subject of carrier aggregation, out of frequencies included in the specific frequency band.

Under such a precondition, the UE 100 (controller) measures the frequency subject to measurement included in the specific frequency band. Specifically, if the eNB 200 does not utilize the frequency subject to measurement as a frequency subject to carrier aggregation, then the UE 100 (controller) measures a received signal strength indicator (RSSI) of the frequency subject to measurement. On the other hand, if the eNB 200 utilizes the frequency subject to measurement as the frequency subject to carrier aggregation, then the UE 100 (controller) measures reception quality of the reference signal (RSRP or RSRQ) used in the frequency subject to measurement.

More particularly, if the eNB 200 does not utilize the frequency subject to measurement as the frequency subject to carrier aggregation, or does not receive configuration information of the reference signal used in the frequency subject to measurement, then the UE 100 (controller) preferably measures the received signal strength indicator (RSSI) of the frequency subject to measurement. On the other hand, if the eNB 200 utilizes the frequency subject to measurement as the frequency subject to carrier aggregation, and receives the configuration information of the reference signal used in the frequency subject to measurement, then the UE 100 (controller) preferably measures the reception quality (RSRP or RSRQ) of the reference signal.

Here, the case where the eNB 200 does not utilize the frequency subject to measurement as the frequency subject to carrier aggregation means that the carrier aggregation is not performed in the frequency subject to measurement with all the UEs 100 that exist in the eNB 200. The case where the eNB 200 utilizes the frequency subject to measurement as the frequency subject to carrier aggregation means that the carrier aggregation is performed in the frequency subject to measurement with any one of the UEs 100 that exist in the eNB 200. The configuration information of the reference signal is configuration information (Configuration) of DRS (Discovery Reference Signal), and is notified to the UE 100 by an RRC message, for example.

The reference signal includes, similarly to the embodiment, a cell-specific reference signal (CRS), a primary synchronization signal (PSS), and a secondary synchronization signal (SSS). The reference signal may include channel quality information (CSI-RS), in addition to the CRS, the PSS, and the SSS.

In the sixth modification, when a case is assumed where all the frequencies included in the specific frequency band are measured by the UE 100, a load of the UE 100 is significantly increased. Therefore, the frequency subject to measurement preferably is designated by the eNB 200. The frequency subject to measurement may be the component carrier subject to sensing described in the fifth modification. That is, the frequency subject to measurement may be the component carrier subject to sensing selected by the sensing result of the eNB 200.

(Communication Method)

Figure 15:
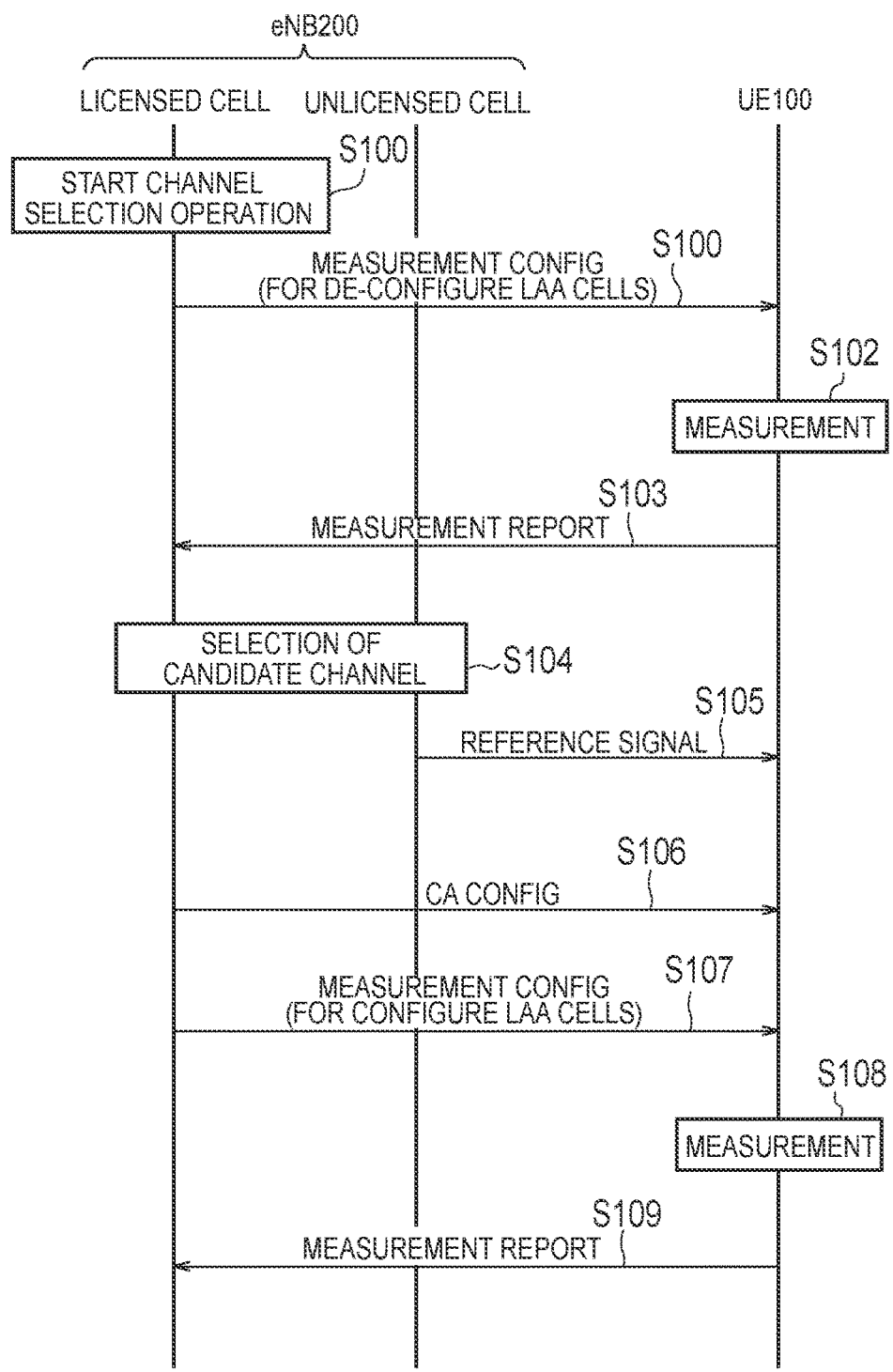
FIG. 15 is a sequence diagram showing a communication method according to a sixth modification of the embodiment.

A communication method according to the embodiment will be described, below. FIG. 15 is a sequence diagram showing the communication method according to the sixth modification. In FIG. 15, a case is shown as an example where the eNB 200 has the licensed cell and the unlicensed cell.

As shown in FIG. 15, in step S100, the eNB 200 starts selection (channel selection) of a frequency (component carrier) available to the eNB.

In step S101, the eNB 200 transmits, to the UE 100, a message for designating, as the frequency subject to measurement, a frequency not used for the carrier aggregation (de-configure LAA cells). The frequency not used for the carrier aggregation may be replaced by a frequency not utilized by the eNB 200. It is noted that the message may a message for designating, as the frequency subject to measurement, not only the frequency not used for the carrier aggregation (de-configure LAA cells) but also the frequency used for the carrier aggregation (configure LAA cells).

In step S102, the eNB 200 does not utilize the frequency subject to measurement as the frequency subject to carrier aggregation, and thus, the UE 100 measures the received signal strength indicator (RSSI) of the frequency subject to measurement. In other words, in step S102, the UE 100 measures the received signal strength indicator (RSSI) of the frequency subject to measurement designated in the message.

In step S103, the UE 100 transmits, to the eNB 200, the received signal strength indicator (RSSI) as the measurement result.

In step S104, the eNB 200 selects, on the basis of the received signal strength indicator included in the measurement result, a candidate frequency (component carrier) utilized by the eNB 200.

In step S105, the eNB 200 uses the candidate frequency (component carrier) selected in step S104 to transmit the reference signal.

In step S106, the eNB 200 transmits, to the UE 100, a message for designating the candidate frequency (component carrier) selected in step S104 as the frequency (component carrier) used for the carrier aggregation.

In step S107, the eNB 200 transmits, to the UE 100, a message for designating a frequency used for the carrier aggregation (configure LAA cells) as the frequency subject to measurement. The frequency used for the carrier aggregation may be replaced by a frequency utilized by the eNB 200.

In step S108, the eNB 200 utilizes the frequency subject to measurement as the frequency subject to carrier aggregation, and thus, the UE 100 measures reception quality of the reference signal (RSRP and RSRQ) used in the frequency subject to measurement.

In step S109, the UE 100 transmits, to the eNB 200, the reception quality (RSRP and RSRQ) as the measurement result.

In the sixth modification, if the eNB 200 utilizes the frequency subject to measurement as the frequency subject to carrier aggregation, then the UE 100 measures the reception quality of the reference signal (RSRP and RSRQ) used in the frequency subject to measurement; however, in addition to the reception quality of the reference signal (RSRP and RSRQ), the received signal strength indicator (RSSI) of the frequency subject to measurement may be measured. Further, if the eNB 200 utilizes the frequency subject to measurement as the frequency subject to carrier aggregation, then the UE 100 may transmit, to the eNB 200, as the measurement result, the reception quality of the reference signal (RSRP and RSRQ) and the received signal strength indicator (RSSI).

(Operation and Effect)

In the sixth modification, if the eNB 200 does not utilize the frequency subject to measurement as the frequency subject to carrier aggregation, then the UE 100 measures the received signal strength indicator of the frequency subject to measurement. Therefore, if the eNB 200 does not utilize the frequency subject to measurement as the frequency subject to carrier aggregation and the reference signal is not transmitted in the frequency subject to measurement, then it is possible to resolve a problem that there is no object (reference signal) of which the reception quality (RSRP and/or RSRQ) should be measured, and the eNB 200 is capable of utilizing the measurement result of the received signal strength indicator. It should be noted that the measurement result (RSSI) of the received signal strength indicator is information useful when selecting the frequency (component carrier) available to the eNB 200 from among an unused frequency (component carrier) included in the specific frequency band.

[Seventh Modification]

A seventh modification of the embodiment will be described, below. A difference from the embodiment will be described, below.

In the seventh modification, the UE 100 (transmitter) transmits, to the eNB 200, location information for identifying the location of the UE 100, together with the received signal strength indicator (RSSI) of the frequency subject to measurement included in the specific frequency band. The location information is used for determining whether or not the UE 100 is located in the coverage area of a cell in which the frequency subject to measurement is used.

In much the same way as in the sixth modification, if the eNB 200 does not utilize the frequency subject to measurement as the frequency subject to carrier aggregation, then the UE 100 (transmitter) may transmit, to the eNB 200, the location information together with the received signal strength indicator of the frequency subject to measurement.

Here, the location information may be reception quality (RSRP and RSRQ, for example) of a signal transmitted by using the carrier band to which the eNB 200 belongs. The location information may be information indicating a geological location obtained by a GPS function provided in the UE 100.

Figure 16:
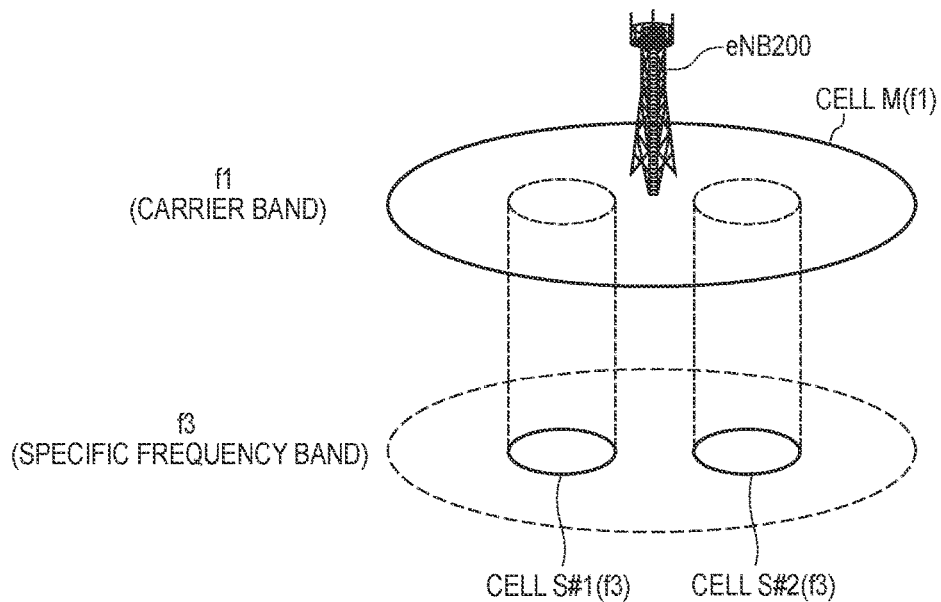
FIG. 16 is a diagram showing a scenario example according to a seventh modification of the embodiment.

For example, in a first scenario, as shown in FIG. 16, there are a macro cell M (f1) in which a carrier band f1 is used, a small cell S#1 (f3) in which a specific frequency band f3 is used, and a small cell S#2 (f3) in which the specific frequency band f3 is used.

In such a case, the UE 100 transmits, to the eNB 200, the reception quality (RSRP and RSRQ, for example) of the signal transmitted from the macro cell M (f1), together with the received signal strength indicator (RSSI) of the signal transmitted from the small cell S#1 (f3) or the small cell S#2 (f3). The reception quality (RSRP and RSRQ, for example) of the signal transmitted from the macro cell M (f1) is an example of the location information.

Figure 17:
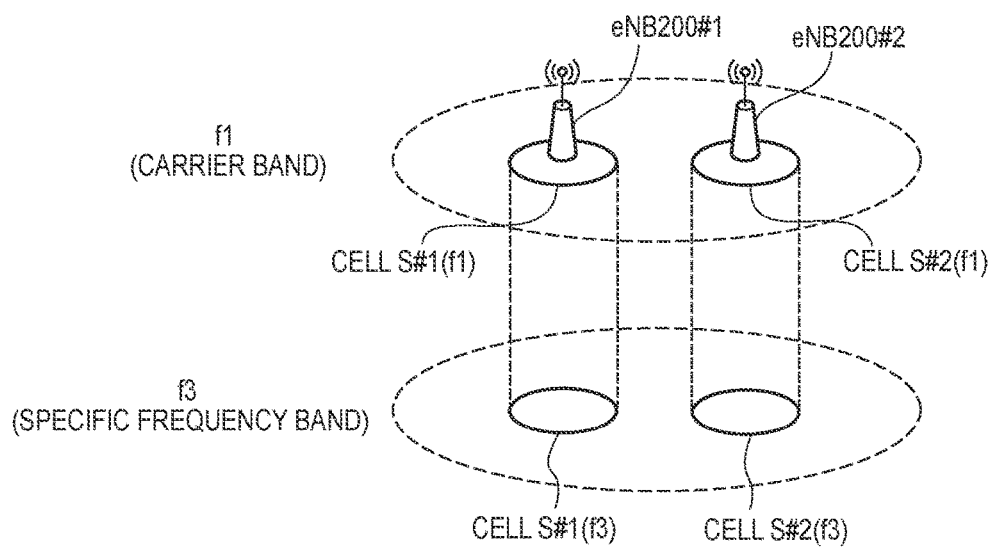
FIG. 17 is a diagram showing a scenario example according to the seventh modification of the embodiment.

Alternatively, in a second scenario, as shown in FIG. 17, there are a small cell S#1 (f1) in which the carrier band f1 is used, a small cell S#2 (f1) in which the carrier band f1 is used, a small cell S#1 (f3) in which the specific frequency band f3 is used, and a small cell S#2 (f3) in which the specific frequency band f3 is used. It is preferable that the coverage area of the small cell S#1 (ft) overlaps the coverage area of the small cell S#1 (f3), and the coverage area of the small cell S#2 (f1) overlaps the coverage area of the small cell S#2 (f3).

In such a case, the UE 100 transmits, to the eNB 200, the reception quality (RSRP and RSRQ, for example) of the signal transmitted from the small cell S#1 (f1) or the small cell S#2 (f1), together with the received signal strength indicator (RSSI) of the signal transmitted from the small cell S#1 (f3) or the small cell S#2 (f3). The reception quality (RSRP and RSRQ, for example) of the signal transmitted from the small cell S#1 (f1) or the small cell S#2 (f1) is an example of the location information. It should be noted that the reception quality (RSRP and RSRQ, for example) of the signal transmitted from the small cell in which the carrier band f1 is used is used as the location information, and thus, the accuracy of determining whether or not the UE 100 is located in the coverage area of the small cell in which the specific frequency band f3 is used is higher than that in the first scenario.

Figure 18:
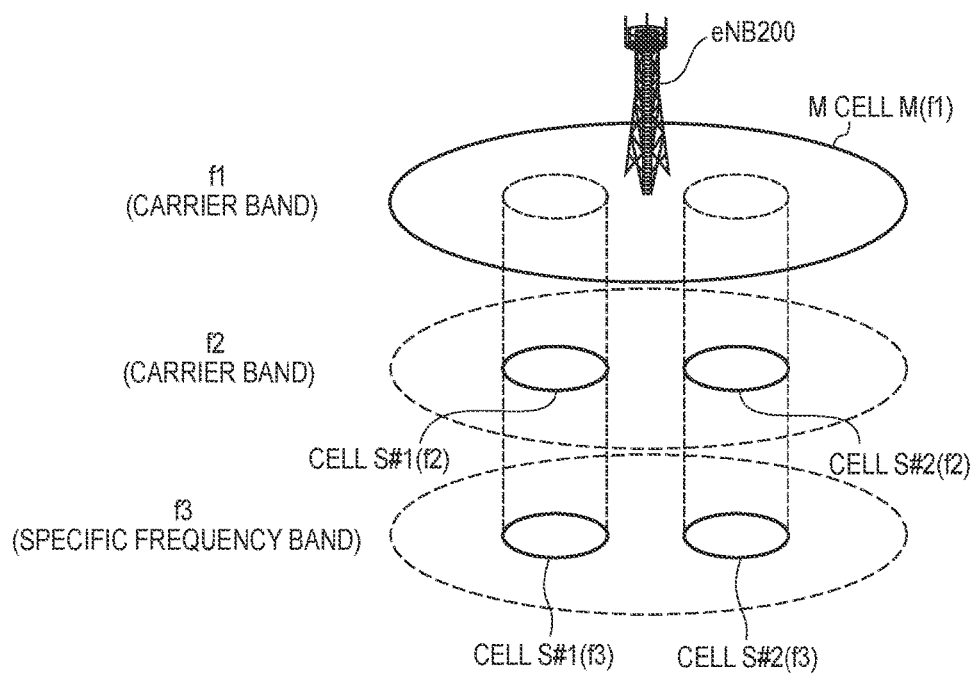
FIG. 18 is a diagram showing a scenario example according to the seventh modification of the embodiment.

Alternatively, in a third scenario, as shown in FIG. 18, there are the macro cell M (f1) in which the carrier band f1 is used, a small cell S#1 (f2) in which a carrier band f2 is used, a small cell S#2 (f2) in which the carrier band f2 is used, the small cell S#1 (f3) in which the specific frequency band f3 is used, and the small cell S#2 (f3) in which the specific frequency band f3 is used. It is preferable that the coverage area of the small cell S#1 (f2) overlaps the coverage area of the small cell S#1 (f3), and the coverage area of the small cell S#2 (f2) overlaps the coverage area of the small cell S#2 (f3).

In such a case, it is preferable that the UE 100 transmits, to the eNB 200, the reception quality (RSRP and RSRQ, for example) of the signal transmitted from the small cell S#1 (f2) or the small cell S#2 (f2), together with the received signal strength indicator (RSSI) of the signal transmitted from the small cell S#1 (f3) or the small cell S#2 (f3). It should be noted that as compared with a case where the reception quality (RSRP and RSRQ, for example) of the signal transmitted from the macro cell M (f1) in which the carrier band f1 is used is used as the location information, the accuracy of determining whether or not the UE 100 is located in the coverage area of the small cell in which the specific frequency band f3 is used is higher.

(Operation and Effect)

In the seventh modification, the UE 100 (transmitter) transmits, to the eNB 200, the location information for identifying the location of the UE 100 together with the received signal strength indicator (RSSI) of the frequency subject to measurement included in the specific frequency band. Therefore, it is possible to determine whether or not the UE 100 is located in the coverage area of the cell in which the frequency subject to measurement included in the specific frequency band is used.

[Other Embodiments]

The present disclosure is described through the above-described embodiments, but it should not be understood that this disclosure is limited by the statements and the drawings constituting a part of this disclosure. From this disclosure, various alternative embodiments, examples, and operational technologies will become apparent to those skilled in the art.

The reference signal transmission cycle, which is a cycle in which the reference signal is transmitted, may be set by the eNB 200. The reference signal may be continuously and repeatedly transmitted with a single reference signal transmission opportunity. A repeated transmission count of the reference signal may be set by the eNB 200.

In the seventh modification, a case where the eNB 200 utilizes the frequency subject to measurement included in the specific frequency band is described by using carrier aggregation as an example; however, the seventh modification is not limited thereto. The eNB 200 may utilize the frequency subject to measurement for a purpose other than the carrier aggregation.

Although not particularly mentioned in the embodiments, a program for causing a computer to execute each process performed by the UE 100 and the eNB 200 may be provided. Further, the program may be recorded on a computer-readable medium. When the computer-readable medium is used, it is possible to install the program in a computer. Here, the computer-readable medium recording therein the program may be a non-transitory recording medium. The non-transitory recording medium is not particularly limited; the examples thereof may be a recording medium such as a CD-ROM and a DVD-ROM.

Alternatively, a chip may be provided which is configured by: a memory in which a program for performing each process performed by the UE 100 and the eNB 200 is stored; and a processor for executing the program stored in the memory.

In the embodiments, the LTE system is described as an example of the mobile communication system. However, the embodiment is not limited thereto. The mobile communication system may be a system other than the LTE system.

[Additional Statement]

Matters of additional statements of the present embodiment will be described below.

(Additional Statement A)

(A1) Introduction

In the Addition Statement A, we discuss the additional essential enhancements not addressed in order to meet the design targets from the perspective of coexistence with Wi-Fi and other LAA services.

Figure 19:
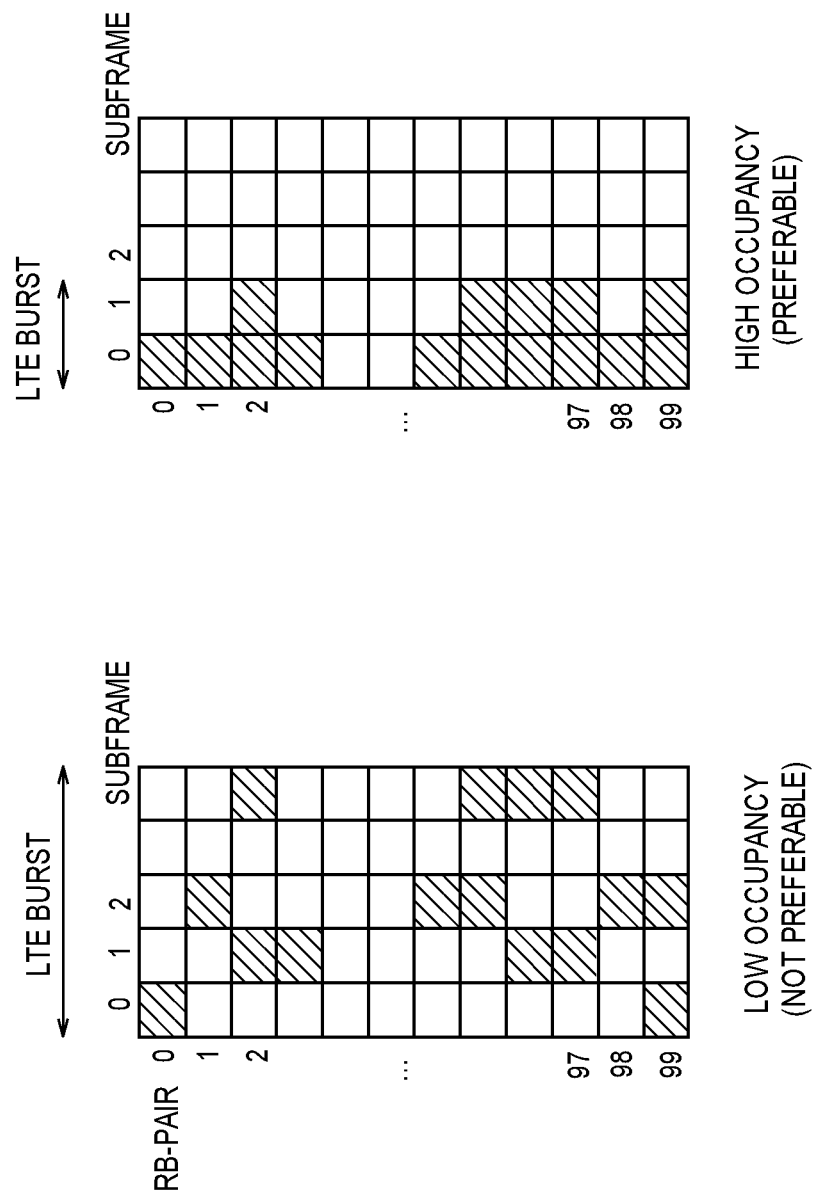
FIG. 19 is a diagram for describing resource occupancy.

(A2) Essential Enhancements (A2.1) Carrier/Resource Occupancy Rule in Unlicensed Spectrum In order to achieve fair coexistence with other unlicensed spectrum deployments such as Wi-Fi and other LAA services, unlicensed spectrum resources must be used efficiently. The preferable situation is when the LTE eNB uses minimum amount of unlicensed spectrum resources in order to achieve fairness in sharing the spectrum with other technologies. For example, the LHS section in FIG. 19 shows inefficient occupancy where several of the resources within a transmission are unused. On the other hand, the RHS section in FIG. 19 shows an efficient approach where all the used resources are allocated compactly as the duration of the burst is reduced. Therefore, a study is needed to understand if any carrier or resource occupancy rule for unlicensed spectrum should be standardized.

We prefer a minimum resource occupancy rule for LTE transmission Burst should be specified. Note that we define a unit of discontinuous transmission duration as a LTE Burst. Until the eNB has sufficient amount of data to be transmitted that occupies more than the minimum resource occupancy threshold only then the eNB is allowed to transmit in unlicensed spectrum.

Proposal 1: In order to achieve fair coexistence with other unlicensed spectrum deployments, a minimum resource occupancy rule for a LTE Burst transmission should be specified.

(A2.2) Synchronization Between UE and Cell in Unlicensed Spectrum

This study is focused on LTE Carrier Aggregation configurations and architecture where one or more low power Scell(s) (i.e., based on regulatory power limits) operate in unlicensed spectrum and is either DL-only or contains both the UL and the DL. Therefore, it can be assumed the PCell in licensed spectrum and the SCell in unlicensed spectrum are synchronized in accordance to the current CA requirements. This implies the UE can achieve coarse timing synchronization with the SCell based on the PCell's synchronization signal especially for the co-located scenario. However, this coarse-synchronization may not be sufficient to meet the time/frequency tracking requirements since the propagation characteristics in the SCell in unlicensed spectrum could be quite different. Therefore, it is preferable if the SCell in unlicensed spectrum provides some sort of time/frequency tracking assistance to the UEs. If the unlicensed spectrum is used on an "on demand" basis then it is reasonable to assume the small cell ON/OFF techniques and the DRS for synchronization can be reused. However, the current Rel-12 SCE based DRS design cannot be used because the eNB may not have access to the unlicensed carrier for DRS transmission if the channel is busy. Therefore, further study is needed how to enhance the current DRS signal design or additional procedures that might be required for resolving the above issue.

Proposal 2: Cells in unlicensed spectrum should provide time/frequency tracking assistance on the operating channel. The enhanced Rel-12 DRS design should be considered as a candidate for providing such assistance.

(A2.3) RRM Measurement/CSI Measurement (RRM Measurement)

As we mentioned in section (A2.2), the propagation characteristics of the cells in licensed spectrum are quite different from the cells in unlicensed spectrum. In addition, the transmission power in the unlicensed spectrum is restricted by regulation. If the channel conditions are different in the unlicensed spectrum from the licensed spectrum then UEs need to provide the radio environment's information of unlicensed spectrum enabling the eNB to notice whether UEs are in the coverage of SCell in unlicensed spectrum. This requires the eNB to transmit appropriate reference signals in the unlicensed carrier for UEs to monitor and perform RRM measurements. The reference signal design should be based on the existing signal design or an already discussed design in other WIs, for example, NCT. Improvements and enhancements can be made to resolve issues related specifically to the unlicensed spectrum (such as one described in section (A2.2)). We note the reference signal design also depends on the transmission modes supported for the transmissions in the unlicensed spectrum. If only the DM-RS based demodulation TM are supported then the reference signals for RRM measurement are not needed to be transmitted in every subframe. In that case, reusing DRS should be baseline. A study is needed for resolving the unlicensed spectrum related potential issue described in section (A2.2).

Proposal 3: Cells in unlicensed spectrum should provide an appropriate reference signals for RRM measurements. The reference signal design should either use the existing design or already discussed designs in previous WIs with enhancements taking the unlicensed spectrum specific issues into account.

(PCI (Physical Cell ID) Collision Avoidance)

Regarding the RRM measurement, there is a potential issue if the same PCI is used by multiple operators. Same PCI should not be allocated to the neighboring cell. Within an operator's network, it can be achieved by cell planning or SON function. However, the problem remains when the same PCI is used by other operators located in the proximity of the first operator. In our opinion, either UE assisted or eNB based PCI collision avoidance mechanism in unlicensed spectrum should be introduced.

Proposal 4: PCI collision avoidance mechanism in unlicensed spectrum should be introduced.

(CSI Measurement)

Dynamic scheduling should be supported in unlicensed spectrum. Regarding the self-scheduling case, further study is needed to verify if the existing (E)PDCCH design is robust enough. In addition to support "on demand" transmissions in the unlicensed carrier enhancements are needed enabling the eNB to acquire necessary feedbacks from UE. Therefore, the existing CSI feedback procedure must be enhanced in order to handle the unlicensed spectrum specific issues (such as described one in section (A2.2)).

Proposal 5: It should consider enhancing the existing CSI feedback procedure/design in order to handle the unlicensed spectrum specific issues.

(A2.3.4) Transmission Modes Supported in Unlicensed Spectrum

It is yet to be decided which transmission mode will be supported in unlicensed spectrum. In our opinion, MIMO should be supported in unlicensed spectrum for achieving maximum throughput. We also believe beamforming based technologies can be effective mitigating interference in the unlicensed spectrum. In order to support multi-antenna transmission technologies in unlicensed spectrum appropriate CSI feedback and procedures are required. We propose it should address which TM on unlicensed spectrum should be supported. Our preference is only DM-RS based demodulation TM should be supported.

Proposal 6: Only DM-RS based demodulation TM should be supported in unlicensed spectrum.

(A2.4) HARQ Protocols

Figure 20:
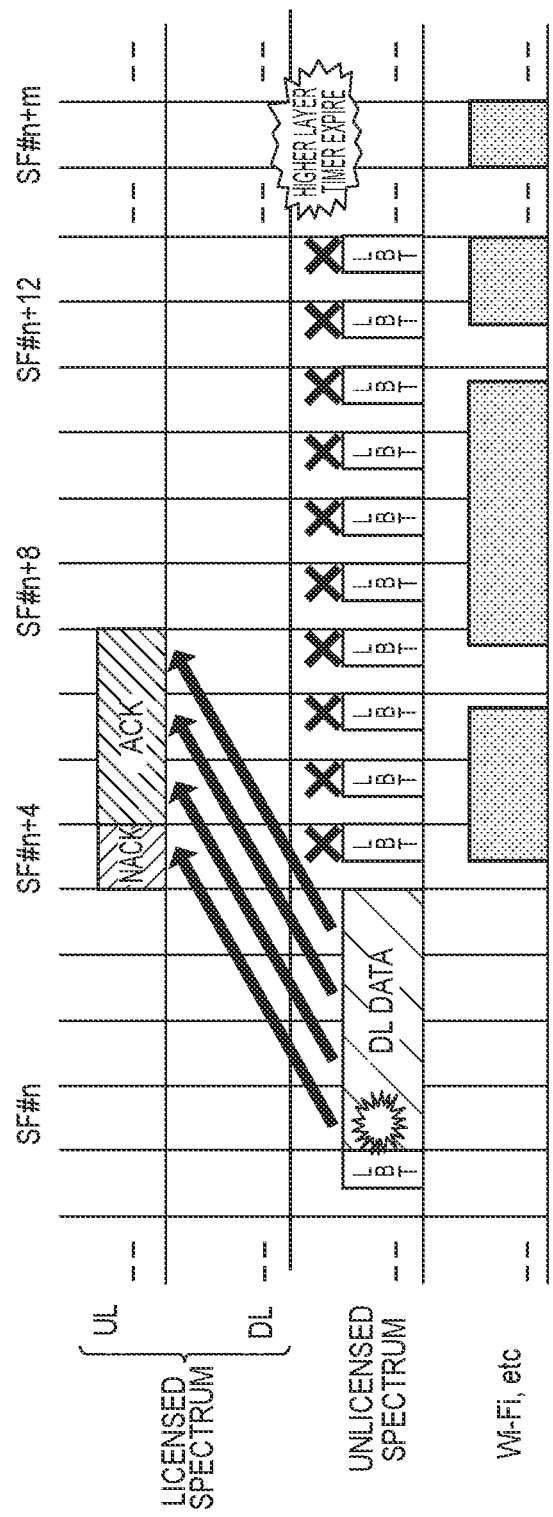
FIG. 20 is a diagram for describing an issue of a PDSCH retransmission.

HARQ ACK/NACK transmission and corresponding retransmission should be modified for the LAA burst transmissions. Assuming Carrier Aggregation (CA) is applied to LAA operation, ACK/NACK for PDSCH transmitted on SCell is transmitted on PCell. An eNB is expected to send retransmission data over the unlicensed channel in NACK case, however if the channel is busy then the retransmission is not possible (See FIG. 20). If eNB cannot access the unlicensed channel for a long time-period then the higher layer timer will expire resulting in retransmission failure. Therefore, it should consider how eNB handles the incomplete HARQ processes for achieving efficient retransmission mechanism.

Figure 21:
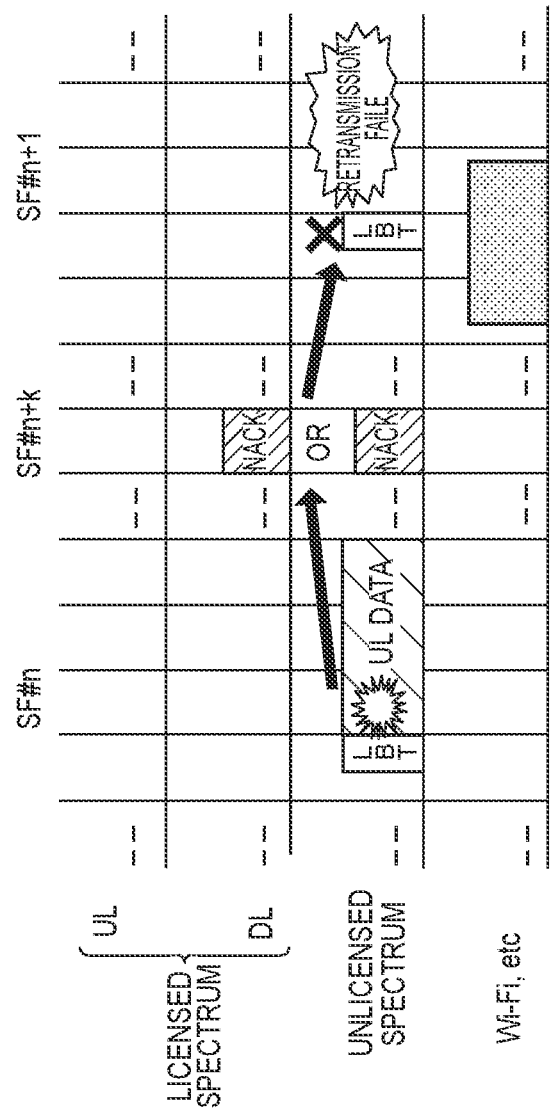
FIG. 21 is a diagram for describing an issue of a PUSCH retransmission.

Similar to PDSCH retransmissions, the ACK/NACK for PUSCH on the SCell in unlicensed spectrum should also be considered if unlicensed spectrum is used for UL data transmissions (See FIG. 21). Since access to the unlicensed spectrum is not guaranteed the eNB may not be able to follow PUSCH retransmission procedures. Only synchronous HARQ scheme is supported by the existing UL HARQ operation which may not be sufficient for the UL data transmissions. Therefore, it should study whether a new HARQ process is needed to support the UL data transmissions.

Proposal 7: It should consider how the eNB handles the incomplete HARQ processes for achieving efficient retransmission mechanism.

The summary of our view is shown in Table 1. The Table 1 indicates Additional Essential functionalities.

TABLE 1

| Functionality | Description |
| --- | --- |
| Resource occupancy rule | A study is needed to understand if the minimum resource occupancy rule for a LTE Burst must be specified resulting in fair coexistence with Wi-Fi. E.g., if traffic is less than the minimum resource occupancy, unlicensed spectrum usage is not permitted by LTE. |
| Synchronization | DRS is reused as baseline. A study is needed for base station behavior if LBT is applied and if base station detects higher interference than the threshold. |
| RRM measurement | DRS is reused as baseline. A study is needed for base station behavior if LBT is applied and if base station detects higher interference than the threshold. |
| PCI (Physical Cell ID) collision avoidance mechanism | Either UE assisted or eNB based PCI collision avoidance mechanism should be introduced. |
| Scheduling and necessary feedbacks including Multi-antenna Transmission support | A study is needed how eNB acquire necessary feedbacks for dynamic scheduling from UE if unlicensed spectrum is used on an "on demand" basis. Also a study is needed which transmission modes are supported in unlicensed spectrum and what feedbacks from the UE are needed for "on demand" unlicensed spectrum is to be used. |
| HARQ protocols | A study is needed for HARQ design especially when unlicensed spectrum is used on an "on demand" basis. |

(A3) Analysis of Detailed Solutions
(A3.1) Frame Structure

It is requested to determine a single global solution for LAA. Therefore, one unified LAA solution meeting the regulations of each country or region should be studied. Since the regulations of unlicensed spectrum are different in each country or region, it is desirable to design a system using the most stringent countries' and regions' regulations.

In the last meeting, it agreed to introduce Listen-before-talk (Clear channel assessment) and discontinuous transmission on a carrier with limited maximum transmission duration to meet the regulatory requirements in some regions/bands. It means the "bursty" transmissions are used by the Cells in unlicensed spectrum and in some countries/regions the Listen-before-talk (LBT) is performed before the burst transmission. Since a single global solution is expected, we propose the maximum duration of a transmission burst should be 4 ms for meeting the most stringent requirement i.e., Japanese regulation. There is another alternative to consider configurable burst length. However, according to the European regulation, the minimum gap length between contiguous bursts depends on the burst length. To satisfy both the configurable burst length and the gap related to the burst length, the frame design would be complicated and we prefer to simply single burst length in the standards. Having a fixed burst length based frame structure helps to reduce the standardization workload. Although this frame structure is required only for Europe and Japan, we suggest LBT and discontinuous transmission should be mandatory features for LAA operation. These features are also beneficial in achieving fair coexistence with other technologies such as Wi-Fi.

Proposal 8: LBT and discontinuous transmission should be mandatory features for LAA operation. The maximum transmission duration of a transmission burst should be 4 ms.

(LBT Burst Design)

Figure 22:
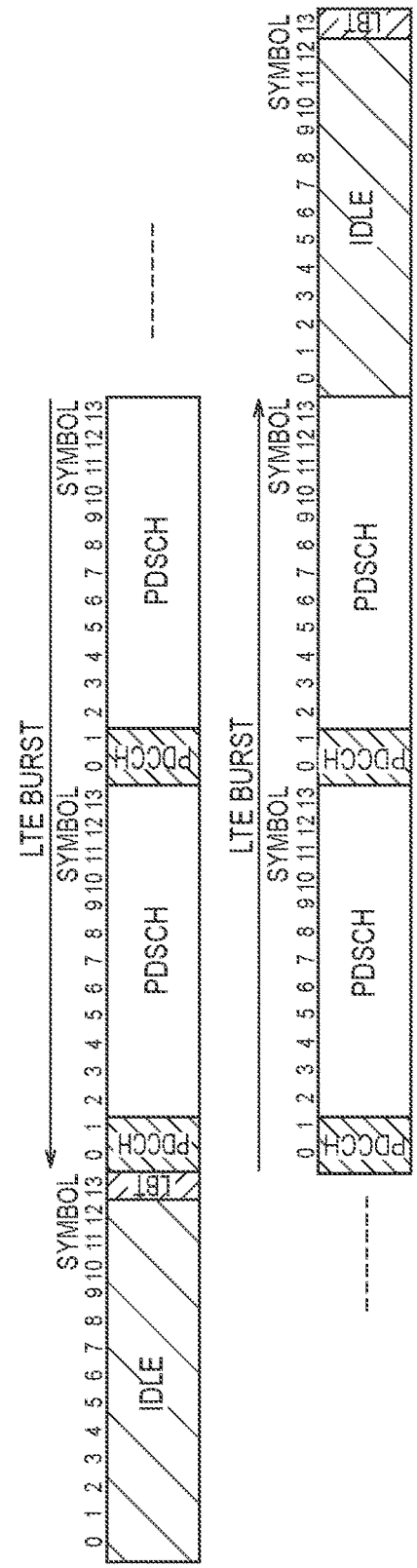
FIG. 22 is a diagram for describing an LTE burst design (Alt 1).
Figure 23:
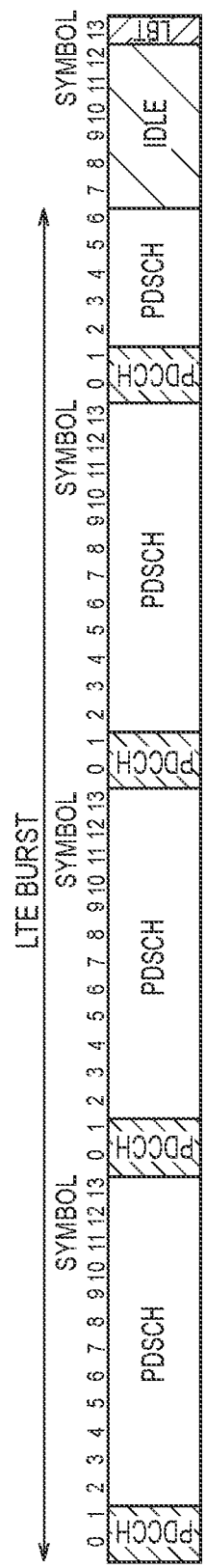
FIG. 23 is a diagram for describing an LTE burst design (Alt 2).

A LTE Physical Layer for unlicensed spectrum should reuse the existing LTE Rel-12 design with extension to meet the regulations requirements. Therefore, the start position of data transmission must be predefined. The location of LBT should be designed taking into account above restriction. Some of the following frame structures can be considered:

The simplest approach is to have four contiguous subframes as one LTE Burst (FIG. 22 (Alt 1)). This design assumes one Idle-subframe for every one LTE burst and the LBT occurs during the last symbol of the Idle-subframe which is right before the next LTE burst transmission. Even though this alternative (Alt 1) can use four subframes for data transmission, eNB should wait at least one subframe to transmit the next LTE Burst. Assuming the fair coexistence can be achieved by this structure, but the spectrum usage is inefficient during the low traffic load scenarios. Therefore, an enhancement to Alt. 1 can be considerable as shown in the FIG. 23 (Alt 2). In this alternative (Alt 2), the last few symbols of the last subframe within the four contiguous subframes used for LTE burst transmission. Although, the data transmission is suspended before the 4 ms expiration, the next LTE Burst can be started from the next subframe boundary. (For Further Study: if the last subframe is achieved by the DwPTS).

Figure 24:
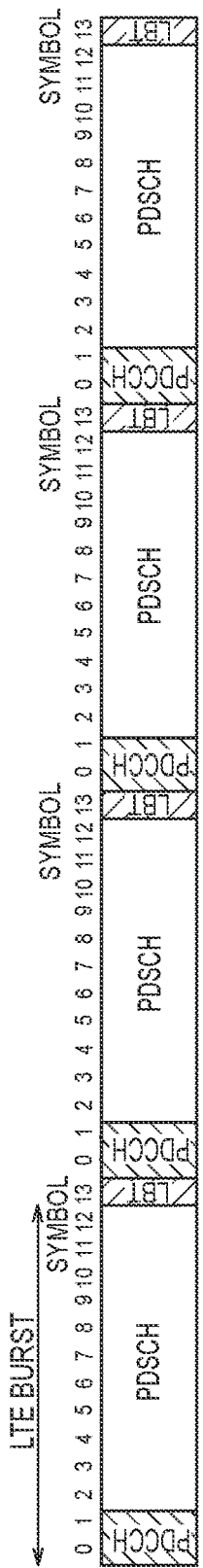
FIG. 24 is a diagram for describing an LTE burst design (Alt 3).

If the LTE Burst design is expected to keep 1 ms periodicity of subframe boundaries, the location of LBT should be placed within the subframe like FIG. 24 (Alt 3). In this alternative (Alt 3), the location of LBT is placed on the last one or two symbols of each subframe. If one symbol is enough for LBT, it may be achieved by puncturing the last symbol.

Figure 25:
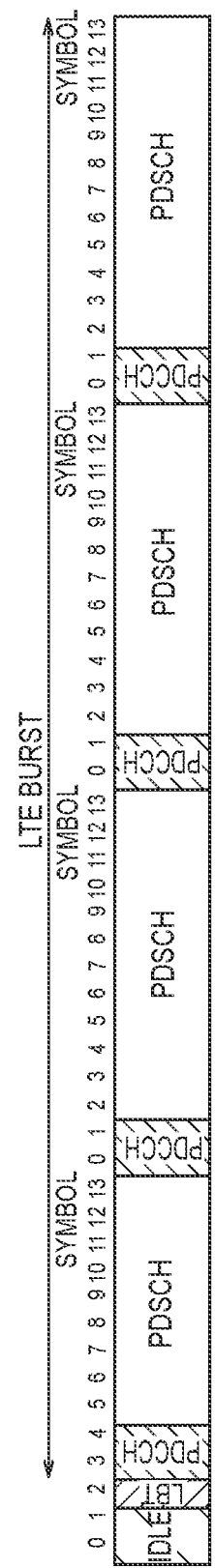
FIG. 25 is a diagram for describing an LTE burst design (Alt 2').
Figure 26:
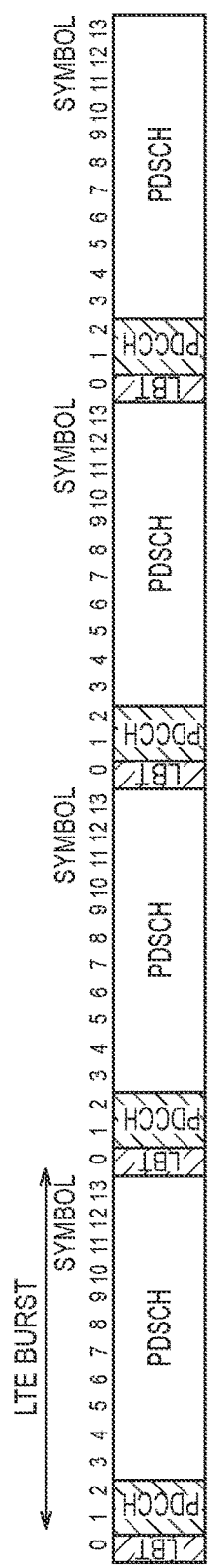
FIG. 26 is a diagram for describing an LTE burst design (Alt 3').

If the LTE Burst design doesn't need to follow the existing Rel-8 LTE frame structure then a new design can be introduced. We show the Alt 2' and Alt 3', which is based on Alt 2 and Alt 3 by shifting the location of the LBT to the first symbol-time of the first subrame (FIG. 25 and FIG. 26). Note if EPDCCH is supported for self-scheduling then Alt 2' and 3' are can be modified by removing the PDCCH and replacing it with PDSCH is For Further Study. Since CA based LAA operation is assumed, common search spaces are not needed in PDCCH on unlicensed spectrum.

Figure 27:
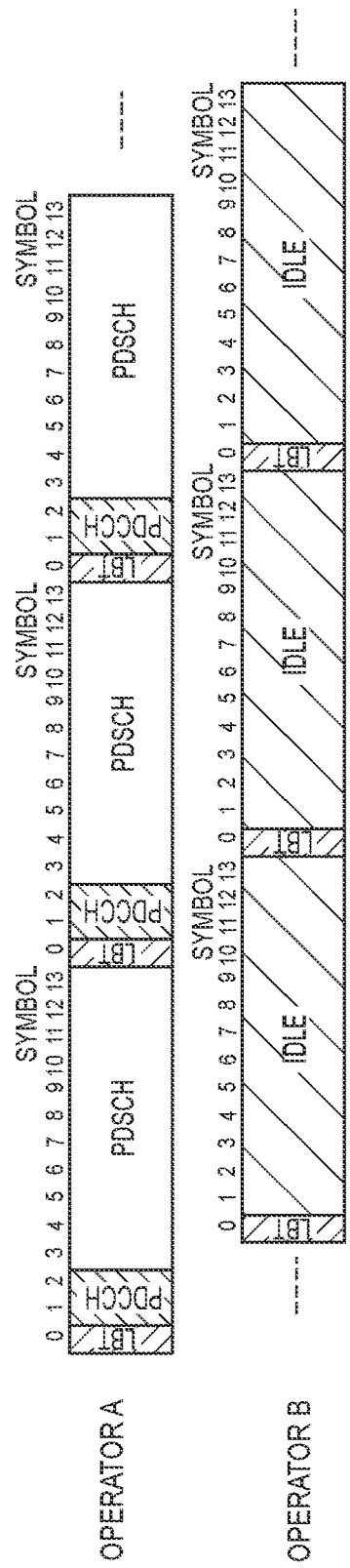
FIG. 27 is a diagram for describing an issue of an LBT location.

However, Alt 2 (or 2') and 3 (or 3') have a potential issue in case more than two eNBs belonging to different operators share the same unlicensed spectrum carrier. As we show in FIG. 27, if the operator B's LBT timing is overlapped by the operator A's data transmission timing, operator B cannot use the channel until operator A stop its transmission. Note that it is hard for operator B to change the timing of unlicensed cell's subframe boundary since it is aligned with the cell in licensed spectrum due to CA based LAA operation.

There are two possible solutions. One is to introduce random back-off mechanism. For example, the eNB after ending the first set of LTE burst transmissions is not allowed to start the next set of LTE Burst transmissions until the back-off period expires. The back-off period duration should be equal to the multiples of a subframe-duration and the number of LTE burst transmissions per set is For Further Study.

Figure 28:
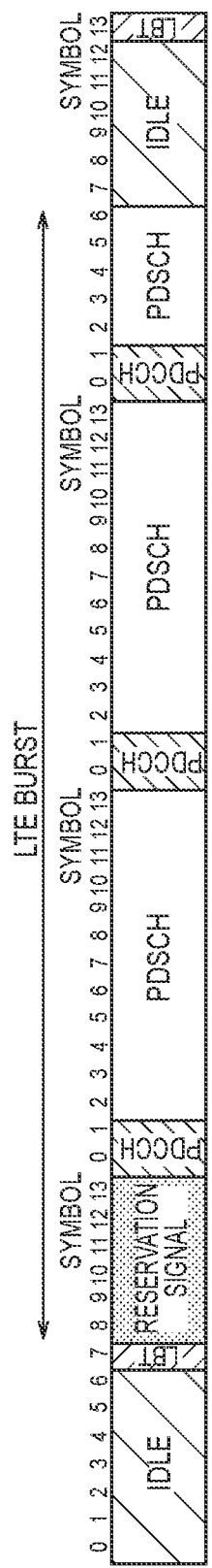
FIG. 28 is a diagram for describing an example of a flexible LBT location.

The other solution is to have a "header subframe". This design allows the eNB to perform LBT anytime within the subframe and then transmit a reservation signal until the next subframe boundary (See FIG. 28). The reservation signal design details are For Further Study. However, in this case the LTE Burst starts from the reservation signal transmission the length of the data transmission has to be reduced accordingly. This can be achieved by puncturing the last few symbols. A regular LTE Burst will follow the "header subframe". The header subframe is transmitted during the first subframe of the first burst transmission for every set of burst transmissions. As mentioned before the number of LTE burst transmissions per is set is For Further Study.

It should compare all of the above options and decide which model should be specified based on the simulations results. However, in general we prefer Alt. 3 with random back-off because the standard impact is small and the channel usage is seems more efficient compared to other options.

Proposal 9: It should compare the options and decide which model should be specified based on the simulation results.

(A3.2) Operation Carrier Selection (Channel Bandwidth in Unlicensed Spectrum)

5 GHz spectrum is divided into 20 MHz wide chunks bandwidth for use in Wi-Fi. In our opinion, Component Carrier (CC) in unlicensed spectrum should be aligned with this bandwidth for better coexistence. The maximum number of aggregated CC should be 5 whether the CC is in licensed spectrum or unlicensed spectrum. It means up to 4 CCs in unlicensed spectrum should be aggregated at same time if needed. However, some restriction should be introduced for fair coexistence with Wi-Fi and other LAA services. For example, eNB not using unlicensed spectrum can use the CC in unlicensed spectrum has a priority over the eNB already using unlicensed spectrum.

Proposal 10: Component Carrier (CC) in unlicensed spectrum should be aligned with 20 MHz bandwidth for better coexistence.

(Channel Selection)

Figure 29:
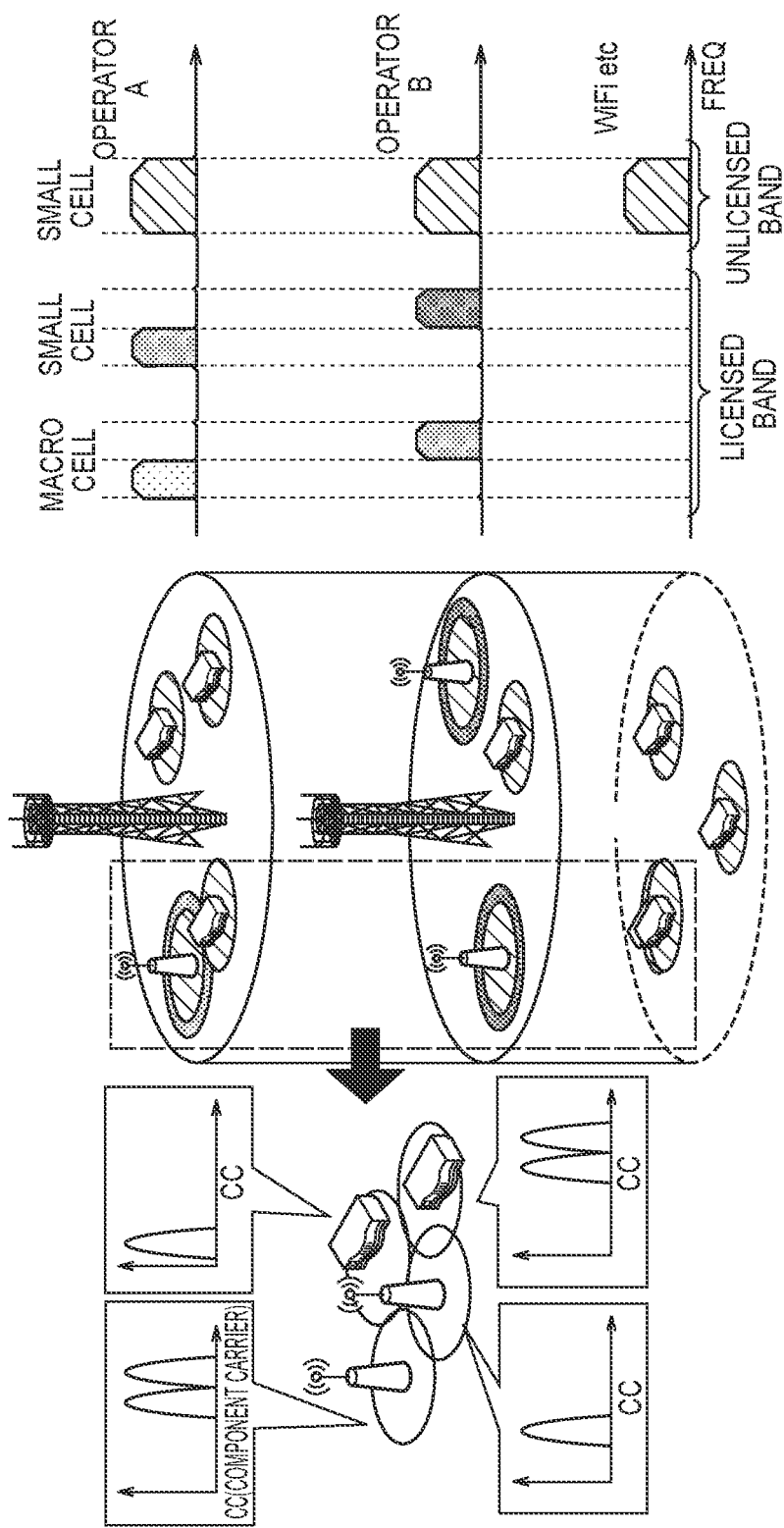
FIG. 29 is a diagram for describing a channel selection.

Channel selection is one of the most important features for LAA operation (FIG. 29). In order to achieve fair coexistence with other unlicensed spectrum deployments, the eNB should be able to select a channel which has the least amount of interference among the available multiple carriers. We understand the LAA channel selection algorithm is an implementation issue however, it can be assumed the algorithms are based on some sort of long term carrier sensing and energy detection.

(Hidden Node Problem)

Figure 30:
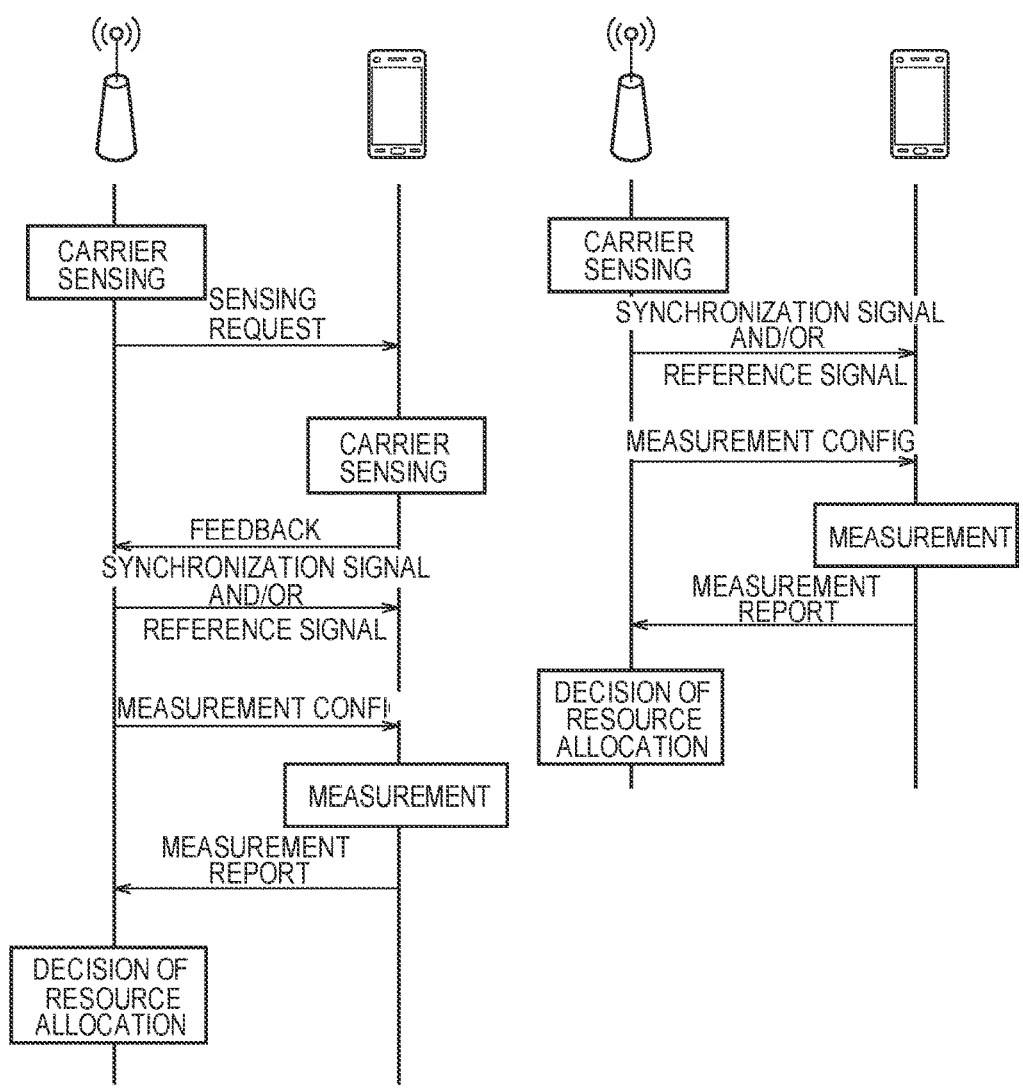
FIG. 30 is a diagram for describing two solutions for a channel selection manner.

We believe the hidden node problem should be taken into account when designing the channel selection procedures/schemes. In one approach both the eNB and the UE can measure the candidate channel for the channel selection (See left of FIG. 30). One approach is either the eNB or the UE detect the interference level of the channel to be higher than a threshold, it can be assumed that channel is occupied. The UE has to report back to the eNB if the interference is higher than the threshold. We term this process as dual-sensing. In another approach, only the eNB does the sensing (See right of FIG. 30). We term is process as single-sensing. In both dual and single sensing the eNB transmits reference/synchronization signal in unlicensed CC and request the UE to send measurement reports. The dual-sensing requires additional signaling compared to single-sensing and a complicated procedure to identify which UE must do the sensing, etc.

Proposal 11: LAA should support single-sensing scheme. In addition, the UE sends measurement reports of the unlicensed carrier helping the eNB to determine whether the channel is busy.

(Dynamic Frequency Selection (DFS))

In the previous meeting, it was agreed that DFS for radar avoidance in certain bands/regions should be introduced. In our opinion, the detailed algorithm should be up to implementation since thresholds for DFS requirements are not the same for each case. It means DFS should be an optional feature and should be introduced only the countries (or regions) in which DFS is a mandatory function for unlicensed spectrum usage. Only corresponding tests for satisfying each regulation requirements should be standardized in 3GPP.

Proposal 12: DFS should be an optional feature and only corresponding tests for satisfying the each regulation requirements should be standardized in 3GPP.

(Dynamic Carrier Switching)

As we described in section (A2.4), there is a possibility that eNB cannot use the unlicensed channel for a long period of time resulting in incomplete HARQ processes. In this case, it could be beneficial if the retransmission data can be sent over another available unlicensed channel. Since the amount of unlicensed spectrum available is large enough, the eNB should keep performing carrier sensing continuously in the background for switching carrier dynamically. If eNB detects an appropriate carrier when the current channel is busy for a certain time, HARQ retransmissions can be allowed on the non-busy unlicensed channel. This procedure requires increased signaling overhead in exchange for the carrier-diversity benefit.

In addition, inter-CC hopping can be achieved by this dynamic carrier switching mechanism. Since the interference characteristics on unlicensed spectrum are unpredictable, frequency-hopping may be an effective technique for unlicensed spectrum operation. Further study is needed for the detailed procedure.

Proposal 13: Dynamic carrier switching mechanism should be introduced for LAA operation.

(Fast SCell ON/OFF Switching)

For achieving dynamic carrier switching mechanism, fast SCell ON/OFF switching should be enabled. New L1 procedures for SCell ON/OFF switching were discussed. However, it could not reach a consensus and no new mechanism was introduced. Fast SCell ON/OFF switching mechanism should be discussed again based on the existing agreements.

Proposal 14: Fast SCell ON/OFF switching mechanism should be introduced in Rel-13.

(A3.3) LTE Beacon (Broadcast Channel) Transmission

There is a situation that one unlicensed spectrum CC is shared by more than one LAA service. In that case a tight coordination is preferable between the LAA services. Both time-domain and frequency-domain based resource allocation can be considered. Regarding the time domain resource sharing, periodic resource sharing or burst resource sharing should be considered. In this situation, it might be beneficial if the unlicensed spectrum usage information is shared with the neighboring node by broadcasting the information. This broadcast information is delivered over the "LTE Beacon" LAA services should detect neighboring LTE Beacons and set their own LAA parameters appropriately and then they can broadcast them as well. The candidate contents of LTE Beacon are: the configuration of unlicensed spectrum's synchronization signal or reference signal, the traffic load information of unlicensed spectrum and so on. In addition, LTE Beacon can also be used for sharing which channel is selected by the node its LAA operations.

Figure 31:
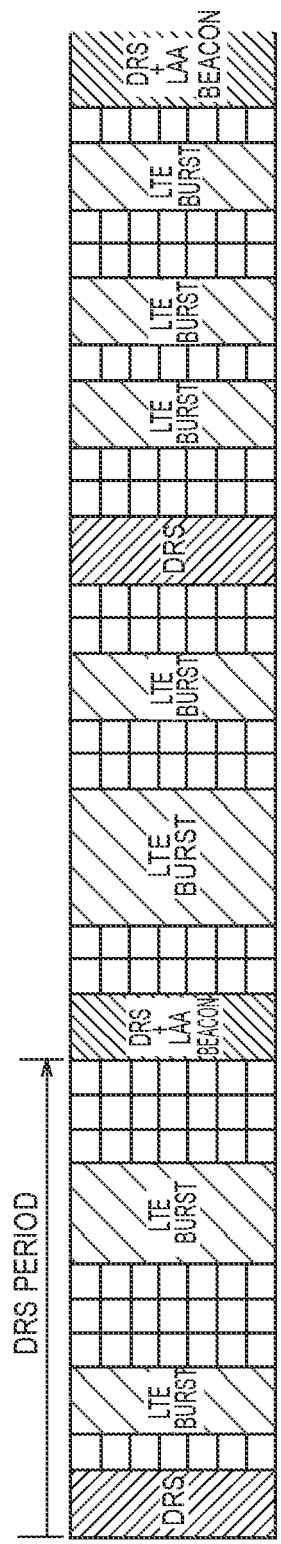
FIG. 31 is a diagram for describing an example of an LTE beacon transmission.

FIG. 31 shows the timing of the LTE Beacon transmission. For example, the beacon can be transmitted along every other DRS transmission (if DRS is supported for LAA).

Proposal 15: The unlicensed spectrum usage information should be broadcasted to other operators over LTE Beacons.

(A4) Conclusions

In the Addition Statement, we discuss the other necessary enhancements not addressed to achieve the design targets from the perspective of coexistence with Wi-Fi and other LAA services.

(Additional Statement B)

(B1) Introduction

The evaluation assumptions and methodologies of LAA were discussed. In this Additional Statement B, we consider the remaining details of the evaluation assumptions and methodologies, especially focusing on the number of carriers, the performance metrics and the UE bandwidth.

(B2) Number of Carriers Parameter

The combination of the number of nodes X and the number of carriers Y was discussed and the following agreement was made:

Agreements:
Node density per operator
  X nodes per operator per indoor/outdoor cluster
  20 MHz carrier frequencies available in unlicensed band
    Nodes (eNB/AP) and UE use one of the Y carrier frequencies for transmission.
      FFS: Use of more than single carriers of eNB/AP and UE is not precluded.
  One 10 MHz carrier frequency in licensed band
  Suggested options (FFS: Down selection among following options):
    Alt. 1: X=Y=4
    Alt. 2: X=Y=10
    Alt. 3: X=4, Y=1
    Alt. 4: {Alt. 1 or Alt. 2}+Alt. 3

Figure 32:
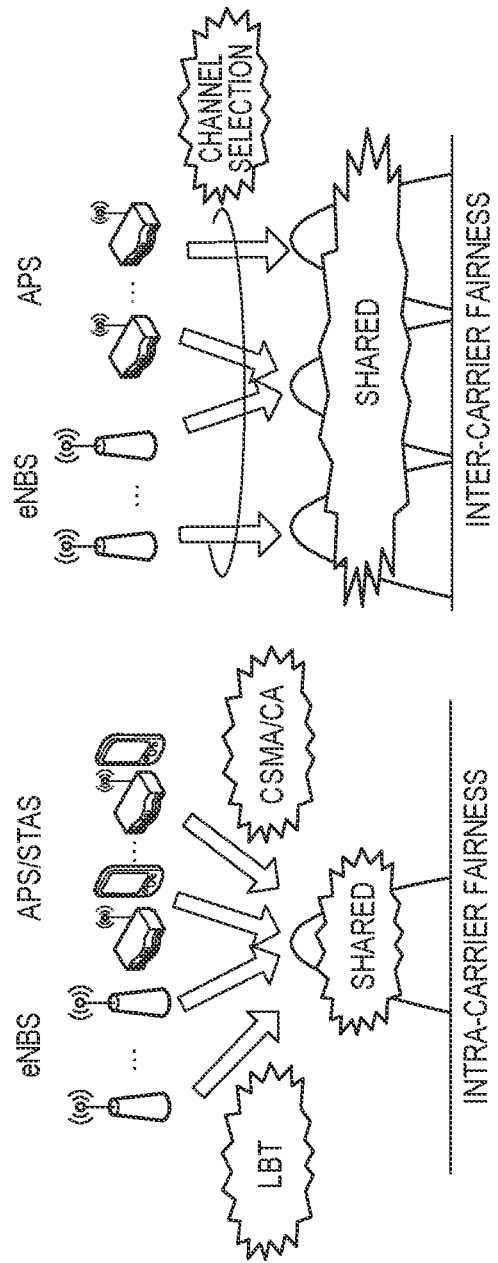
FIG. 32 is a diagram for describing an intra-carrier and inter-carrier fairness.

Whether the number of carriers Y=1 should be included or not was one of the major topic of discussion. We support Alt. 3 as the baseline since the fairness between LAA and Wi-Fi is relatively easier to evaluate if simple model is used. Additionally, we propose the number of carriers Y=4 should also be included in the evaluation scenarios. The fairness between LAA and Wi-Fi evaluation can be divided into two sub-categories: the intra-carrier fairness and inter-carrier fairness. Both are defined as follows and shown in FIG. 32.

1. Intra-carrier fairness: the fairness between LAA LBT related functionalities and Wi-Fi CSMA/CA (when both technologies share one unlicensed carrier).

2. Inter-carrier fairness: the fairness between LAA channel selection and Wi-Fi channel selection (when both technologies share multi-unlicensed carriers).

Both types of fairness should be considered.

In other words, evaluation of intra-carrier fairness focuses on the time domain based spectrum-sharing aspects while the evaluation of the inter-carrier fairness focuses on the frequency domain based spectrum-sharing aspects. The inter-carrier fairness can be evaluated using Alt. 1, and the intra-carrier fairness can be evaluated using Alt. 3.

In addition, we propose Alt. 3 should be given higher priority than the Alt. 1 because using Alt. 1 we cannot distinguish between effects of LAA LBT related functionalities and channel selection and we believe evaluating each functionality separately should be needed.

Proposal 1: The number of carriers Y=1 (Alt. 3) and Y=4 (Alt. 1) should be supported. In addition, Alt. 3 is the baseline assumption for the evaluations study.

(B3) Performance Metrics

The performance metrics agreed in the previous meeting (e.g. UPT CDF and Latency CDF) are the metrics per UE/STA and not per channel. Based on one carrier scenario (e.g. Y=1, Alt. 3), the evaluation results would indicate the intra-carrier fairness. However, in the multi-carrier scenarios (e.g. Y=4, Alt. 1), the evaluation results won't be able to distinguish between effects of both the intra-carrier and inter-carrier fairness. To evaluate the inter-carrier fairness, we suggest the channel selection rate and/or the channel throughput should be considered as the performance metrics. The channel selection rate is defined as the rate of each LLA/Wi-Fi channel was selected.

Proposal 2: The channel selection rate and/or the channel throughput should be considered as the performance metrics. The channel selection rate is defined as the rate of each LAA/Wi-Fi channel was selected.

(B4) UE Bandwidth

LAA cell can use both the licensed band (10 MHz) and the unlicensed band (20 MHz) for the data transmission. The evaluation results depend on the offloading algorithm, i.e. how much data offload to the unlicensed band. Therefore, the offloading algorithm should be same for each operator in order to understand the evaluations results. We propose the percentage of offloading should be fixed or at least for the initial study phase the data transmissions occur only in unlicensed band.

Proposal 3: We propose the percentage of offloading should be fixed or at least for the initial study phase the data transmissions occur only in unlicensed band.

(Additional Statement C)

(C1) Introduction

In addition to use RRM measurements for CA operation, it looks several companies think RRM measurement results on LAA cell can be used by eNB when operating channel selection. In this Additional Statement C, we discuss RRM measurement on LAA cell with taking this use case into account.

(C2) Discussion

Channel selection is one of the most important features for LAA operation. In order to achieve fair coexistence with other unlicensed spectrum deployments, the eNB should be able to select a channel which has the least amount of interference among the available multiple carriers. We understand the LAA channel selection algorithm is an implementation issue however, it can be assumed the algorithms are based on some sort of long term carrier sensing and energy detection by LAA cell. As a consequence, eNB may select the lowest interfered channel at the center of the LAA cell. In addition with LAA cell's carrier sensing and energy detection, it should be considered if the candidate channel's measurement results from UEs located near LAA cell are useful. Even though LAA cell is using the lowest interfered channel at the center of LAA cell and transmits DL traffic to UE using that channel, UE may not receive that DL traffic due to communication between invisible nodes at LAA cell. Therefore, it should be much better eNB select the lowest interfered channel among LAA cell's potential coverage. We believe this "dual-sensing" based operating channel selection will be an advantage of LTE system than the other radio communication system for providing reliable communication. This mechanism is more effective if LAA support UL transmission. Therefore, we propose it designs RRM measurement procedures for eNB to allow using the measurement result for channel selection.

Proposal 1: It should design RRM measurement procedures for eNB to allow using the measurement result for channel selection.

Channel selection is triggered when eNB change LAA cell's operating channel as well as when eNB add or start to use new LAA cells. If eNB detects an available channel or there is a better channel than the current using unlicensed channel, it should be done as soon as possible. From this point of view, UE should measure and report unlicensed channels as much as possible. However, since there are quite broad carriers in unlicensed spectrum it's too much burden for UE to measure all unlicensed band and report available measurement results. For limiting the number of channels which UE measures, eNB should configure measurement objects. We note that eNB can configure the UE with multiple carrier frequencies in the unlicensed band for RRM measurements e.g., depending on UE capability. Details are For Further Study.

If RRM measurement on LAA cell is used for operating carrier selection, LAA cell may not transmit any cell reference signalling on the measurement target channel yet. On the other hand, if LAA cell is already worked on that carrier and eNB just check whether the specific UE is in cell coverage (i.e., RRM measurements on configure LAA cells), LAA cell transmit some cell reference signalling. The former case, it's assumed RSRP (and RSRQ) measurement results are not expected in contrast to the existing RRM measurement. Therefore, eNB should let UE know what kind of measurement results should be requested in RRM measurement configuration. UE may be configured for DMTC configuration of a target LAA cell if RSRP (and RSRQ) measurement is required. Therefore if the UE is configured with the measurements and the DMTC configuration, the UE should report the LAA cell's RSRP (and RSRQ) measurement results. Otherwise, the UE should understand that RSRP (and RSRQ) measurement results are not required.

Proposal 2: eNB should configure measurement objects for LAA cell regardless of cell status.

Proposal 3: If UE is not configured with DMTC configuration for a LAA cell, UE should understand RSRP (and RSRQ) measurement results are not required.

Figure 33:
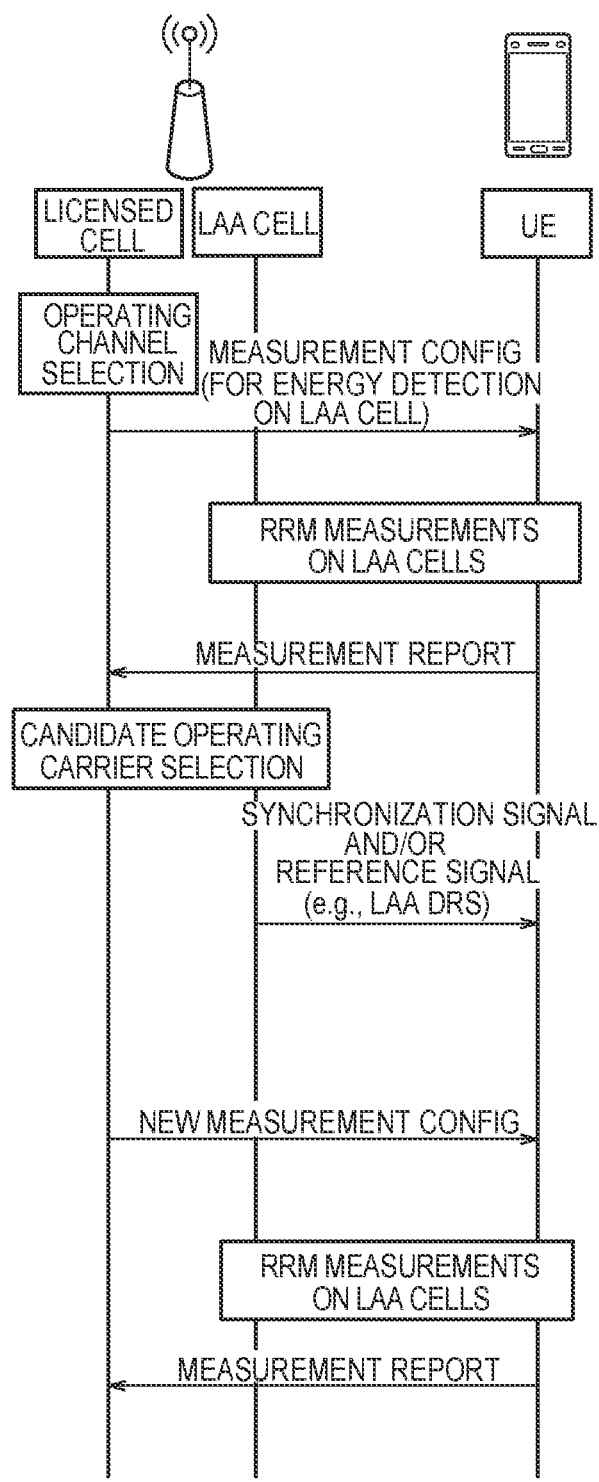
FIG. 33 is a diagram for describing an example of operating a channel selection.

We show an example of operating channel selection in FIG. 33.

It is assumed both the eNB and the UE can measure the candidate channel for the channel selection. If either the eNB or the UE detect the interference level of the channel to be higher than a threshold, it can be assumed that channel is occupied. The UE has to report back to the eNB if the interference is higher than the threshold. In this case, RRM measurements on LAA cell can be used for UE side's energy detection. For achieving UE side's energy detection, RSSI measurement on LAA cell should be introduced. The exact use or definition of RSSI measurements are still under discussion, but the details such as trigger type, configurations in general of RSSI would be handled in advance. Therefore, we discuss above issues in following.

If Proposal 1 is agreed and RRM measurement on LAA cell is used for operating carrier selection, at least event trigger based RSSI measurement reporting should be supported i.e., RSSI measurement result is exceeded the threshold. If periodic RSSI measurement reporting is supported is For Further Study.

Also, various LAA deployment scenarios like below are considered (See FIG. 34). If LAA cells are deployed as scenario 1 and UE report only LAA cell's RSSI measurement result, that measurement result is not so much useful for eNB. If the UE reports RSSI measurements to the PCell, there's no way for the PCell to know whether the location of the measured RSSI value is within coverage of one of its small cells (LAA cells) to be configured. Therefore, it should study how eNB detect the UE's location which report RSSI measurement result of unlicensed band. One of the simplest approach is UE always report RSSI measurement result of Unlicensed band i.e., 5 GHz with RF finger print of licensed band e.g., 2 GHz simultaneously. Note if LAA cell transmit reference signals on the measurement target channel, UE should report measured subframe information and RSRP (and RSRQ) with RSSI. If any assistance information should be reported for allowing eNB to estimate UE's location in this case as well is For Further Study.

Proposal 4: At least event triggered based RRM measurement reporting should be supported for LAA cell.

Proposal 5: If proposal 2 is agreed, it should consider how eNB detect the UE's location which report RRM measurement result of unlicensed band.

(C3) Conclusion

In the Additional Statement, we discuss RRM measurement on LAA cell with taking operation channel selection use case into account.

(Additional Statement D)

(D1) Introduction

The use of the unlicensed spectrum in combination with the licensed spectrum was studied and the results were reported. Taking these results into consideration, a new WI "Licensed-Assisted Access using LTE" for specifying LAA SCells operations with only DL transmissions was approved. "UE support for carrier selection" and "UE support for RRM measurements including cell identification" are included in the WI's objectives. In this Additional Statement D, we provide our views on UE measurements required for the operation in the unlicensed spectrum.

(D2) RRM Measurement Procedure for Operating Carrier Selection

Figure 35:
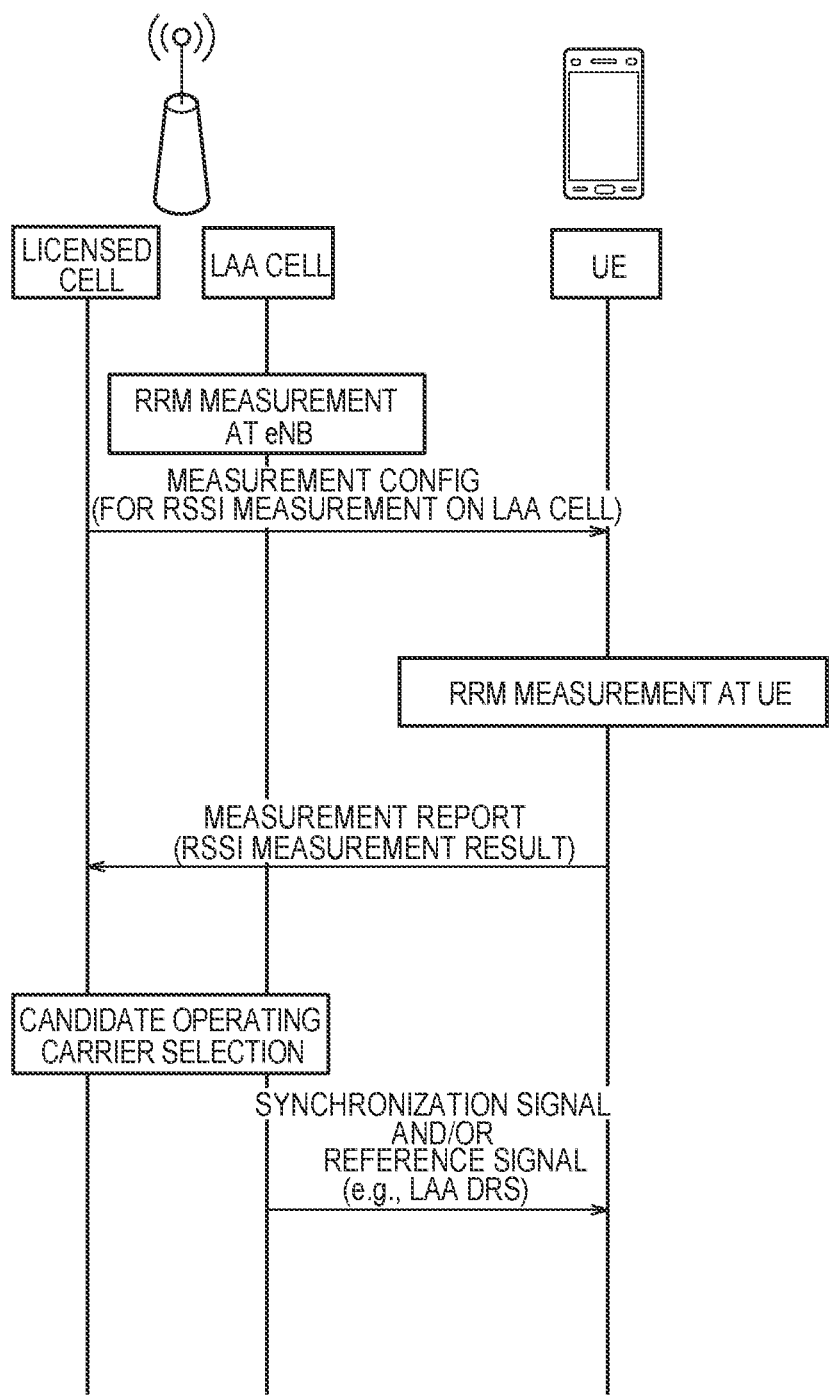
FIG. 35 is a diagram for describing an example of a carrier selection.

It was agreed that carrier selection is required for LAA nodes to select the carriers with low interference and good co-existence with other unlicensed spectrum deployments. To achieve this objective, the eNB should scan and sense channels for interference or radar detection before the eNB begins transmitting the DRS in the target LAA carrier. In addition to the eNB's measurement, it was also agreed that the UE reporting of RSSI measurements to the eNB is useful for the purpose of detecting hidden nodes during the channel selection. Both the eNB and the UE can measure the candidate channel for channel selection. FIG. 35 shows the signaling-flow for setting up the UE to perform the measurements before and after the eNB transmits its RS in the unlicensed carrier.

(D2.1) RM Measurement at eNB

As we mentioned above, RRM measurement for carrier selection is the initial task performed by the eNB before it requests the UEs to perform the RSSI measurements. It is expected for eNB to detect the presence of radar signal, interference level and load level of the candidate carriers in this initial task. Generally speaking, whether the carrier is suitable or not is measured by the interference level and the load level on that carrier. It may be assumed the selected carrier has low interference and load level. We understand the LAA channel selection algorithm is an implementation issue however, it can be assumed the algorithms are based on some sort of long term energy detection and signaling detection; both of them are well-known and are widely used around the world. If signaling detection is used, LAA cell need to detect other LAA cell's transmitted reference signal e.g., LAA DRS. We think it can be achieved without any changes to the specifications since it is observed in SI phase that UE physical layer cannot distinguish Rel-12 DRSs for cells that belong to different operators based on Rel-12 DRS alone. Then LAA cell may detect the other operators' LAA cell ID by PSS/SSS included in DRS without any enhancement as well as UE. Regarding the radar detection, it was already agreed in SI phase that Dynamic frequency selection for radar avoidance can be achieved without any new specifications. Therefore, we think RRM measurement at eNB does not require any changes to the specifications.

Proposal 1: RRM measurement for carrier selection is performed by the eNB before it requests the UEs to perform the RSSI measurements. This does not require any changes to the specifications.

(D2.2) RRM Measurement at UE

As mentioned before the UEs can help detecting the hidden-nodes by reporting their RSSI measurements; therefore, it was agreed the UE reporting of RSSI measurements to the eNB is useful for the carrier selection. In addition to RSSI measurement reports, we believe it would be helpful for eNB to receive the load information from the UEs as well. Regarding how the eNB receives the WLAN's load information, it is already been discussed in LTE-WLAN Radio level integration WI which can be reused for carrier selection in unlicensed band. To avoid any additional complexity and the specification effort we propose the above WLAN load information reporting procedure should also be accepted for the LAA carrier selection.

Proposal 2: The eNB should be allowed to configure the UE for measurement and reporting of RSSI and WLAN load for carrier selection purpose.

One consideration point is whether UE should perform signaling detection in addition to energy detection. From technical perspective, we think it can be available since UE can detect other operators LAA DRS as we mentioned before. However, since it will impose a heavy burden on UE, we do not prefer to introduce signaling detection on other operator's reference signal to UE.

Proposal 3: It should agree UE do not need detecting any reference signal on a specific unlicensed carrier if serving eNB does not transmit LAA DRS on that carrier yet.

(D2.3) RSSI Measurements and Reporting

Although the details of RSSI measurements and reporting procedures are not yet defined, one of the possibilities for RSSI measurement comprises the average of the total received power. In this case, the bandwidth used for averaging the received power may be configurable. Although WLAN usually occupies 20 MHz bandwidth, some countries specify narrower bandwidths. Also LAA's system bandwidth is not restricted to 20 MHz. Therefore, the following was agreed.

Support for at least 20 MHz system BW option in the 5 GHz band
   System bandwidths<5 MHz are not considered for PHY layer options in LAA If two LAA nodes share the available 20 MHz channel, and if each node uses only 5 MHz, then the remaining bandwidth is still available for carrier selection. In this case, UE should also perform RSSI measurement only for the candidate bandwidth. Therefore, eNB should inform the UE of the frequency and the bandwidth for RSSI measurement.

Proposal 4: The eNB should inform the UE of the frequency and the bandwidth for RSSI measurement.

(D3) Conclusions

In the Additional Statement D, we provide our views on UE measurements required for operation in unlicensed spectrum.

(Additional Statement E)

(E1) Introduction

The use of the unlicensed spectrum in combination with the licensed spectrum was studied and the results were reported. Taking these results into consideration, a new WI "Licensed-Assisted Access using LTE" for specifying LAA SCells operations with only DL transmissions was approved. "UE support for carrier selection" and "UE support for RRM measurements including cell identification" are included in the WI's objectives. In this Additional Statement E, we provide our views on UE measurements required for the operation in the unlicensed spectrum.

(E2) Discussion

It was agreed that carrier selection is required for LAA nodes to select the carriers with low interference and good co-existence with other unlicensed spectrum deployments. To achieve this objective, the eNB should scan and sense channels for interference or radar detection before the eNB begins transmitting the DRS in the target LAA carrier. In addition to the eNB's measurement, it was also agreed that the UE reporting of RSSI measurements to the eNB is useful for the purpose of detecting hidden nodes during the channel selection. Both the eNB and the UE can measure the candidate channel for channel selection. FIG. 35 shows the signaling-flow for setting up the UE to perform the measurements before and after the eNB transmits its RS in the unlicensed carrier.

(E2.1) Required RRM Measurements

Generally speaking, whether the carrier is suitable or not is measured by the interference level and the load level on that carrier. It may be assumed the selected carrier has low interference and load level. As mentioned before, UEs can help detect the hidden-nodes by reporting their RSSI measurements; therefore, it was agreed the UE reporting of RSSI measurements to the eNB is useful for carrier selection. In addition to RSSI measurement reports, we believe it would be helpful for eNB to receive the load information from the UEs as well. Regarding how the eNB receives the WLAN's load information, it is already been discussed in LTE-WLAN Radio level integration WI which can be reused for carrier selection in unlicensed band. If any other WLAN measurements defined in LTE-WLAN Radio level integration WI are also useful for carrier selection is For Further Study. In contrast, there is no existing requirement that UE should measure and report RAN load to its serving cell, particularly for the load associated with non-serving PLMNs. Therefore, there is not sufficient justification for creating a new requirement for the UE even if neighbour LAA cells' load information is attainable. Therefore, the UE should only measure and report RSSI and WLAN load information for carrier selection.

Proposal 1: The eNB should be allowed to configure the UE for measurement and reporting of RSSI and WLAN load for carrier selection.

Proposal 2: It should study if other WLAN measurements defined under the LTE-WLAN Radio level integration WI are also useful for carrier selection.

(E2.2)

(D2.3) RSSI Measurements and Reporting

Although the details of RSSI measurements and reporting procedures are not yet defined, one of the possibilities for RSSI measurement comprises the average of the total received power. In this case, the bandwidth used for averaging the received power may be configurable. Although WLAN usually occupies 20 MHz bandwidth, some countries specify narrower bandwidths. Also LAA's system bandwidth is not restricted to 20 MHz. Therefore, the following was agreed.

Support for at least 20 MHz system BW option in the 5 GHz band
System bandwidths<5 MHz are not considered for PHY layer options in LAA If two LAA nodes share the available 20 MHz channel, and if each node uses only 5 MHz, then the remaining bandwidth is still available for carrier selection. In this case, UE should also perform RSSI measurement only for the candidate bandwidth. Therefore, eNB should inform the UE of the frequency and the bandwidth for RSSI measurement.

Proposal 3: The eNB should inform the UE of the frequency and the bandwidth for RSSI measurement.

In addition to the averaging in frequency domain, it should consider how the measurements in the time domain should be carried out. One of the possibilities is that RSSI measurement in the time domain should comprise of the average of the total received power over a configured observation window. In this case, the UE may average several RSSI measurements and report the calculated average to the eNB. The average RSSI facilitates the eNB to decide whether the carrier is completely vacant or not. To improve the spectrum-efficiency, the eNB should be allowed to operate in the LAA SCells even when the unlicensed carriers are not completely vacant given the LAA SCells can fairly co-exist with the neighboring nodes. In such scenarios when the unlicensed carrier are not fully utilized the average RSSI measurements are not always helpful for carrier selection. For example, as shown in FIG. 36, the UE can report the same average RSSI for the different usage characteristics of the carrier. If these two carriers are the least interfered carriers, the eNB may select one of these as the operating carrier for LAA. In contrast, it would be difficult for the eNB to select the appropriate carrier if only the average RSSI measurements are reported by the UE.

To resolve this potential issue, one possible solution is to shorten the observation window and to increase the frequency of measurement reporting. The longer the configured observation window the greater the inaccuracy of the captured channel information reported after the measurements. In order to avoid this potential inaccuracy, shorter observation window should be used for the measurements. However, frequent measurement reporting does have a negative impact to signalling overhead. To reduce the excessive signalling overhead, event trigger based reporting is preferable to periodic reporting. If periodic reporting is applied, it should consider how to obtain a higher accuracy in capturing the channel occupancy information while the frequency of measurement reporting is kept to a reasonable level. One of the feasible solutions is to allow the UE to provide additional assistance information to the eNB along with the average RSSI. For example, the assistance information could consist of how often or the percentage of the time when the RSSI measurements exceed a threshold.

Proposal 4: Both the periodic and the event trigger based reporting should be considered for RSSI measurement.

Proposal 5: If periodic reporting is applied, UEs should report some assistance information in addition to the average RSSI.

Figure 34:
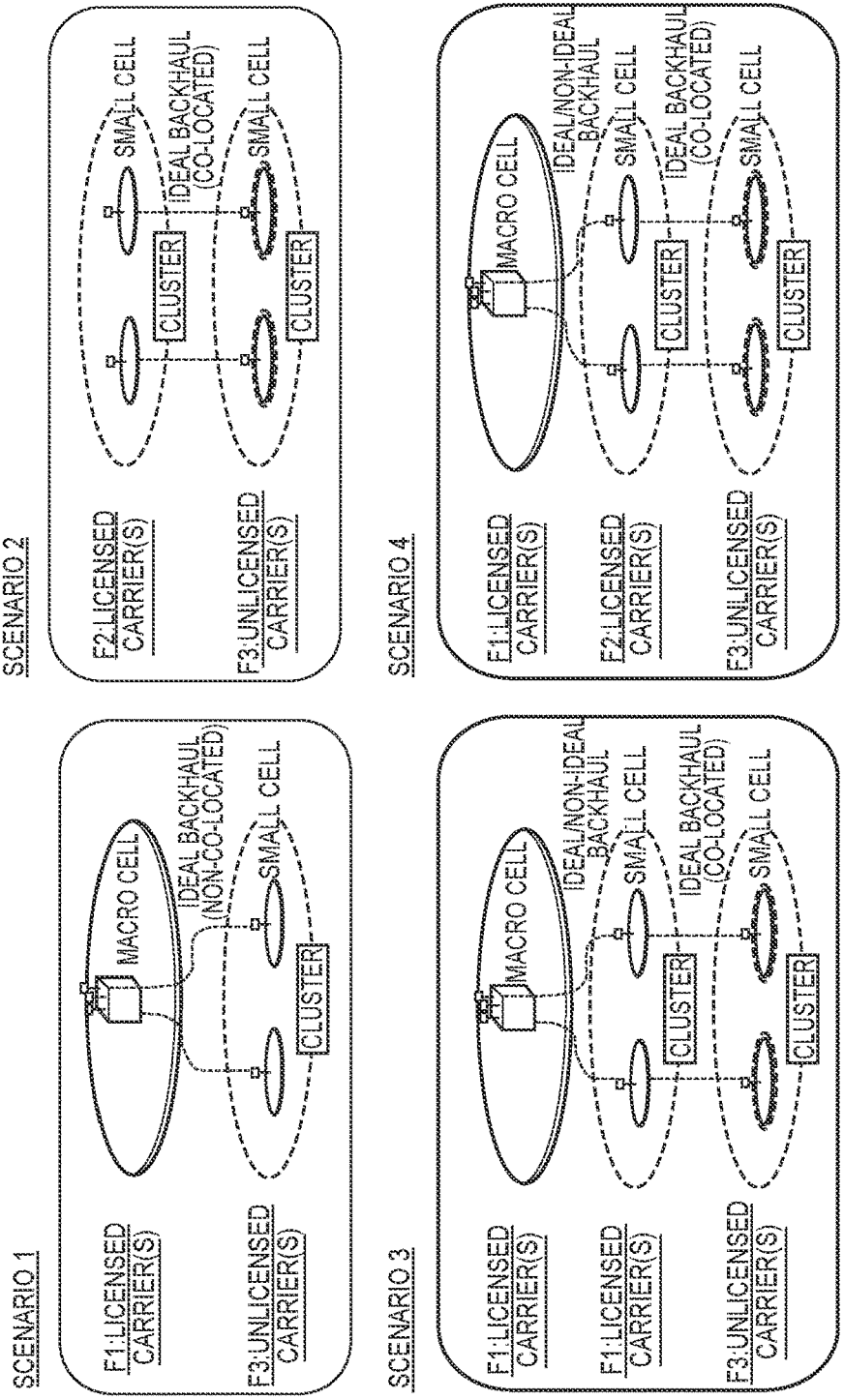
FIG. 34 is a diagram for describing LAA development scenarios.

Various LAA deployment scenarios were considered and reproduced in FIG. 34. In non-collocated deployments (Scenario 1), it is very difficult to determine if the reported RSSI measurements are taken within the coverage of the small cells belonging to the macrocell eNB. Therefore, it would be beneficial to the eNB if the UE were to report the location associated with the reported RSSI measurement on the unlicensed band. One of the most straight forward approaches is for the UE to always report the RSSI measurement of the unlicensed band i.e., 5 GHz along with RF fingerprint of licensed band e.g., 2 GHz. If any assistance information should be reported to allow the eNB to have a better estimate of the UE's location is For Further Study.

Proposal 6: UE should report the RSSI measurement of the unlicensed band along with RF fingerprint of licensed band.

(E3) Conclusion

In the Additional Statement E, we discussed the post processing procedure of UL latency measurements as one of the potential solutions.

The invention claimed is:

1. A radio base station configured to use a specific frequency band which includes a plurality of component carriers having a predetermined bandwidth and which is allowed to be utilized by a plurality of network operators or a plurality of communication systems, comprising:
  a controller configured to select, from among the plurality of component carriers, a target component carrier in which a reference signal used in the specific frequency band should be transmitted; and
  a transmitter configured to use the target component carrier to transmit the reference signal, wherein
  the controller is configured to select, as the target component carrier, a first component carrier that satisfies a first condition,
  the first condition is that an interference power amount falls below a predetermined threshold value, and
  the controller is configured to perform a storing process of storing:
    carrier identification information for identifying a second component carrier that does not satisfy the first condition but satisfies a second condition; and
    at least one of an interference power amount in the second component carrier and a signal count of the reference signals used in the second component carrier, and
  the second condition is that the first condition is not satisfied due to interference received from a same type communication system as a communication system to which the radio base station belongs.

2. The radio base station according to claim 1, wherein if there is no first component carrier, then the controller selects, on the basis of at least one of the stored interference power amount and signal count, as the target component carrier, the one second component carrier from among the plurality of second component carriers.

3. The radio base station according to claim 1, wherein if there are no first component carrier and second component carrier, then the controller limits utilization or addition of a component carrier included in the specific frequency band.

4. The radio base station according to claim 1, wherein the controller determines, on the basis of whether or not a component carrier included in the specific frequency band is already utilized, whether or not to perform the storing process.

5. The radio base station according to claim 1, further comprising: a receiver configured to receive a feedback sent back from a radio terminal in response to the reference signal, wherein the controller determines, on the basis of the feedback, whether or not to utilize the target component carrier for the radio terminal.

6. A radio base station configured to use a specific frequency band which includes a plurality of component carriers having a predetermined bandwidth and which is allowed to be utilized by a plurality of network operators or a plurality of communication systems, comprising:
- a controller configured to select, from among the plurality of component carriers, a target component carrier on which a radio terminal should be instructed to perform sensing; and
- a transmitter configured to transmit, to the radio terminal, a signal to instruct sensing on the target component carrier, wherein
- the controller is configured to select, as the target component carrier, a first component carrier that satisfies a first condition,
- the first condition is that an interference power amount falls below a predetermined threshold value, and
- the controller is configured to perform a storing process of storing carrier identification information for identifying a second component carrier that does not satisfy the first condition but satisfies a second condition, and at least one of an interference power amount in the second component carrier and a signal count of the reference signals used in the second component carrier, wherein
- the second condition is that the first condition is not satisfied due to interference received from a same type communication system as a communication system to which the radio base station belongs.

7. The radio base station according to claim 6, wherein if there is no first component carrier, then the controller selects, on the basis of at least one of the stored interference power amount and signal count, as the target component carrier, the one second component carrier from among the plurality of second component carriers.

8. The radio base station according to claim 6, wherein if there are no first component carrier and second component carrier, then the controller limits utilization or addition of a component carrier included in the specific frequency band.

9. A radio base station configured to use an unlicensed frequency band which includes a plurality of component carriers, comprising:
- a controller configured to select, from among the plurality of component carriers, a target component carrier in which a reference signal used in the unlicensed frequency band should be transmitted;
- a transmitter configured to use the target component carrier to transmit the reference signal and
- a receiver, wherein
- the controller is configured to select, as the target component carrier, a first component carrier that satisfies a first condition,
- the transmitter is configured to transmit to a radio terminal, measurement configuration information indicating a first frequency for received signal strength indicator (RSSI) measurement, the first frequency being within the unlicensed frequency band, and
- the receiver is configured to receive from the radio terminal, a measurement result of the RSSI measurement for the first frequency, wherein
- the measurement result includes average RSSI and channel occupancy information indicating a percentage of samples when measured RSSI exceed a threshold value.

10. The radio base station according to claim 9, wherein the transmitter is configured to transmit, to a radio terminal, a message for identifying an unlicensed frequency band not used for a carrier aggregation as a frequency for measuring reference signal strength of a radio signal.

* * * * *